(12) United States Patent
Nakayama et al.

(10) Patent No.: US 7,651,668 B2
(45) Date of Patent: Jan. 26, 2010

(54) PRODUCTION METHOD AND PRODUCTION DEVICE FOR CARBON NANO STRUCTURE

(75) Inventors: Yoshikazu Nakayama, Hirakata (JP); Hiroyuki Tsuchiya, Kyoto (JP); Yugo Higashi, Kyoto (JP); Toshiki Goto, Osaka (JP); Keisuke Shiono, Osaka (JP); Takeshi Nagasaka, Tokyo (JP); Nobuharu Okazaki, Karushiki (JP)

(73) Assignees: Japan Science and Technology Agency, Saitama (JP); Public University Corporation Osaka Prefecture University, Osaka (JP); Taiyo Nippon Sanso Corporation, Tokyo (JP); Otsuka Chemical Co., Ltd., Osaka (JP); Nissin Electric Co., Ltd., Kyoto (JP)

( * ) Notice: Subject to any disclaimer, the term of this patent is extended or adjusted under 35 U.S.C. 154(b) by 260 days.

(21) Appl. No.: 11/663,451

(22) PCT Filed: Sep. 21, 2005

(86) PCT No.: PCT/JP2005/017419
§ 371 (c)(1),
(2), (4) Date: Oct. 19, 2007

(87) PCT Pub. No.: WO2006/033367
PCT Pub. Date: Mar. 30, 2006

(65) Prior Publication Data
US 2008/0213138 A1    Sep. 4, 2008

(30) Foreign Application Priority Data
Sep. 24, 2004    (JP) .............................. 2004-278507

(51) Int. Cl.
*B01J 8/18*       (2006.01)
*F27B 15/14*      (2006.01)
*B01J 19/18*      (2006.01)
*B01J 19/00*      (2006.01)
*C01B 31/02*      (2006.01)

(52) U.S. Cl. .................. 422/139; 422/143; 422/146; 422/132; 422/134; 422/138; 422/224; 423/445 R

(58) Field of Classification Search ................ 422/139, 422/143, 224, 138, 132, 134, 146; 423/445 R
See application file for complete search history.

(56) References Cited

U.S. PATENT DOCUMENTS 3,497,674 A * 2/1970 Zirngibl et al. ............. 392/466

(Continued)

FOREIGN PATENT DOCUMENTS

CN          1165209        11/1997

(Continued)

OTHER PUBLICATIONS

Machine translation of JP-09324325—Sep. 8, 2009.*

(Continued)

*Primary Examiner*—Walter D Griffin
*Assistant Examiner*—Huy-Tram Nguyen
(74) *Attorney, Agent, or Firm*—Harness, Dickey & Pierce, P.L.C.

(57) ABSTRACT

A material gas and a catalyst are introduced through a material supplying tube path and a catalyst supplying tube path together with a carrier gas into a reactor equipped on its outer periphery with a heat applicator for thermally decomposing the material gas. The reactor has a convention regulator fitted to the discharge end of the catalyst supplying tube path. The convection regulator covers an edge side of the reactor to regulate gas flow in the reactor so that the flow does not reach the edge side. Due to this, a convection state can be efficiently produced in a reaction region. Consequently, it becomes possible to prevent contamination defect caused by accumulation/adherence of concretion of catalyst, which was generated by aggregation of cooled catalyst in the low-temperature region of the reactor and a decomposition product of the material gas. Thus the efficiency of carbon nanostructure production can be improved.

26 Claims, 17 Drawing Sheets

U.S. PATENT DOCUMENTS

| | | | | |
|---|---|---|---|---|
| 3,499,947 | A * | 3/1970 | Johnson | 585/602 |
| 4,207,360 | A * | 6/1980 | Padovani | 427/213 |
| 4,900,411 | A * | 2/1990 | Poong et al. | 204/157.43 |
| 5,290,529 | A * | 3/1994 | Baudequin | 423/337 |
| 6,476,161 | B1 * | 11/2002 | Harlin et al. | 526/65 |
| 2003/0010279 | A1 | 1/2003 | Nakayama et al. | |
| 2003/0012721 | A1 | 1/2003 | Nakayama et al. | |
| 2003/0109382 | A1 | 6/2003 | Nakayama et al. | |
| 2003/0148097 | A1 | 8/2003 | Takikawa et al. | |
| 2004/0253374 | A1 * | 12/2004 | Jung et al. | 427/213 |
| 2007/0057097 | A1 * | 3/2007 | Harutyunyan et al. | 239/654 |

FOREIGN PATENT DOCUMENTS

| | | |
|---|---|---|
| JP | 2860276 | 9/1996 |
| JP | 09-324325 | 12/1997 |
| JP | 11-107052 | 4/1999 |
| JP | 2001-192204 | 7/2001 |
| JP | 2001-310130 | 11/2001 |
| JP | 2003-026410 | 1/2003 |
| JP | 2003-081617 | 3/2003 |
| JP | 2003-138432 | 5/2003 |
| JP | 2003-213530 | 7/2003 |
| JP | 2004-261630 | 9/2004 |
| WO | WO 87/07559 | 12/1987 |

OTHER PUBLICATIONS

Chinese Office Action mailed on Jul. 3, 2009, and English translation thereof.

* cited by examiner

FIG. 12
(12A)
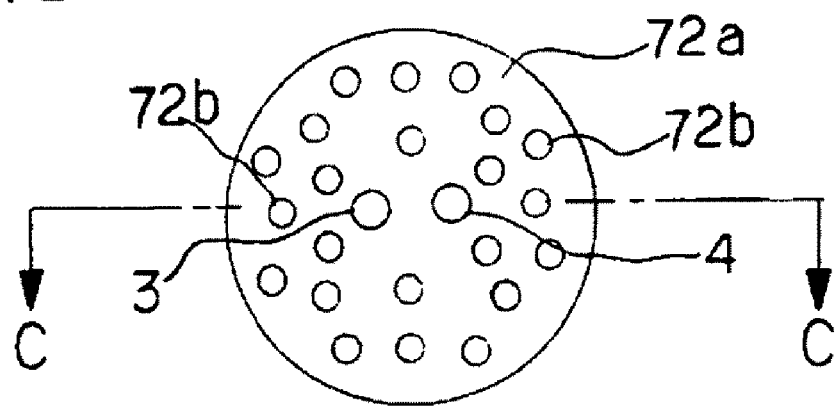
(12B)
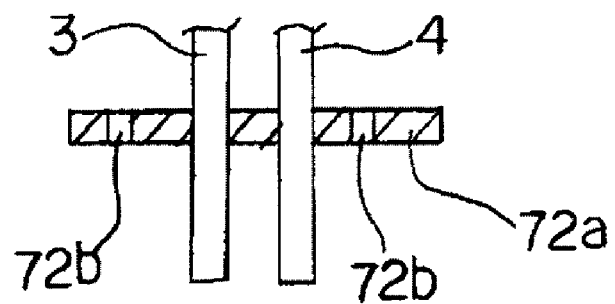

FIG. 15

| EXPERIMENT NUMBER | CONVECTION REGULATOR | GAS FLOW RATE (slm) | | | COLLECTION AMOUNT OF COMPOSITE FROM THE COLLECTION SECTION (g) | | | REMARKS |
|---|---|---|---|---|---|---|---|---|
| | | MATERIAL GAS SPRAYING | | SECOND CARRIER GAS | WITHIN 3 MINUTES AFTER INTRODUCTION OF CATALYST | 3-6 MINUTES | 6-9 MINUTES | |
| | | FIRST CARRIER GAS | MATERIAL GAS | | | | | |
| EXAMPLE 1 | PROVIDED | 2.64 | 0.36 | 3 | 0 | 0.21 | 0.12 | |
| EXAMPLE 2 | PROVIDED | 2.64 | 0.36 | 3 | 0 | 0.11 | 0.23 | DECREASE OF CONVECTION REGULATOR BY 50mm |
| EXAMPLE 3 | PROVIDED | 2.64 | 0.36 | 5 | 0.08 | 0.11 | 0.12 | INCREASE OF CONVECTION REGULATOR BY 50mm |
| COMPARATIVE EXAMPLE 1 | NOT PROVIDED | 2.64 | 0.36 | 3 | 0.12 | 0 | 0 | |
| COMPARATIVE EXAMPLE 2 | PROVIDED | 2.64 | 0.36 | 3 | 0.12 | 0.07 | 0 | INCREASE OF CONVECTION REGULATOR BY 50mm |

PRODUCTION METHOD AND PRODUCTION DEVICE FOR CARBON NANO STRUCTURE

TECHNICAL FIELD

The present invention relates to a production method of a carbon nano structure such as a carbon nanotube, carbon nanocoil etc., by way of contacting a material gas and a catalyst in a reactor. The present invention also relates to a production device of the carbon nano structure.

BACKGROUND ART

A carbon nano structure designates a nano size material constituted of carbon atoms. Examples of carbon nano structure includes carbon nanotube; carbon nanotube with beads, which is a carbon nanotube in which beads are formed; a brush-shaped carbon nanotube constituted of a forest of carbon nanotubes; carbon nanotwist, which is a twisted carbon nanotube; a coil-shaped carbon nanocoil; and spherical shell fullerene.

Carbon nanocoil was synthesized for the first time in 1994 by way of Chemical Vapor Deposition (hereinafter referred to as a CVD method) by Amelinckx, and some other researchers (Amelinckx, X. B. Zhang, D. Bernaerts, X. F. Zhang, V. Ivanov and J. B. Nagy, SCIENCE, 265 (1994) 635). It was also found that, in contrast to the conventional carbon microcoil of amorphous structure, a carbon nanocoil has a graphite crystal structure.

In the method of Amelinckx and others, a single metal catalyst such as Co, Fe, or Ni was processed into fine powder, and the vicinity of the catalyst was heated to 600 to 700° C., and an organic gas such as acetylene or benzene was put into circulation in it to come in contact with the catalyst, so as to decompose the organic molecules. However, according to this method, the shapes of the resulting carbon nanocoils were uneven, and the yield was low. It was therefore assumed that the production was incidental, that is, it was not reliable as industrial production. Therefore there has been a demand for a more efficient method.

In 1999, Li and some other researchers (W. Li, S. Xie, W. Liu, R. Zhao, Y. Zhang, W. Zhou and G. Wang, J. Material Sci., 34 (1999) 2745) succeeded to produce a new carbon nanocoil. According to their method, a catalyst constituted of a graphite sheet with a periphery coated with iron particles was placed in the center, and the vicinity of the catalyst was heated to 700° C. by a nichrome wire. Then a mixture gas of 10% of acetylene and 90% of nitrogen gas in volume was brought into contact with the catalyst to be reacted with the catalyst. However, this method does not ensure a desirable coil yield, and was not sufficient as industrial production.

The key of increase in yield of carbon nanocoil in a CVD method is development of appropriate catalyst. In this view, a part of the inventors of the present invention developed a Fe—In—Sn type catalysts by which the yield increased to 90% or greater. The method is published in Japanese Laid-Open Patent Publication Tokukai 2001-192204 (Patent Document 1: published on Jul. 17, 2001). The catalyst was constituted of an ITO (Indium-Tin-Oxide) substrate on which a mixture thin film of In oxide and Sn oxide is formed and an iron thin film is formed thereon by vapor deposition.

Further, a part of the inventors of the present invention produces Fe—In—Sn type catalysts by an alternative method and succeeded to invent mass production of carbon nanocoil. The invention is disclosed in Japanese Laid-Open Patent Publication Tokukai 2001-310130 (Patent Document 2: published on Nov. 6, 2001). In this case, to produce the catalyst, In organic compound and a Sn organic compound was mixed with an organic solvent to prepare an organic liquid, and the organic liquid was applied on a substrate to form an organic film. Then the organic film was calcined to form a In/Sn oxide film, and an iron thin film was formed on the In/Sn oxide film. The In/Sn oxide film corresponds to the aforementioned ITO film (mixture thin film).

Meanwhile, a part of the inventors of the present invention published a mass production method of carbon nanocoil by catalyst distribution (Japanese Laid-Open Patent Publication Tokukai 2003-26410 (Patent Document 3: published on Jan. 29, 2003)). In this CVD method using catalyst vapor-phase transfer, a hydrocarbon gas was supplied to a heated reactor made of a vertically-placed quartz tube and put into circulation, and the catalyst particles are dispersed in the gas. Then a carbon nanocoil was grown on the surfaces of catalyst particles while the hydrocarbon is decomposed in the vicinity of the catalyst. This method using the dispersed catalyst allows highly-dense growth of a carbon nanocoil. By repeating growth and collection of carbon nanocoil, sequential production of carbon nanocoil becomes possible. Another CVD method using a vertical reactor tube is disclosed in Tokukai 2003-138432 (Patent Document 4: published on May 14, 2003)) which adopts a force feed manner in supplying a material gas into a reactor. In this method, a material gas is sprayed into a reaction region of the reactor tube via a supply nozzle.

[Patent Document 1] Tokukai 2001-192204
[Patent Document 2] Tokukai 2001-310130
[Patent Document 3] Tokukai 2003-26410
[Patent Document 4] Tokukai 2003-138432

DISCLOSURE OF INVENTION

Technical Problem

Through the CVD method taking sufficient time of reacting a material gas and a catalyst, a large number of carbon nanocoils or the like grow on the surfaces of the catalyst particles. In the method of Patent Document 4, the material gas is forced to be fed to a reaction region (force feed manner), and therefore the reaction time with the catalyst decreases. On the other hand, in the method of Document 3, a material gas (hydrocarbon gas) is fluidized in a reactor, and a catalyst is slowly sprayed thereto from an upper portion of the reactor, and then the catalyst is left to fall on a dish on the bottom of the reactor, so that the catalyst is accumulated on the dish. Further, the method of Patent Document 3 discloses a convection method which produces an upward flow or convection in the reactor so as to slow down the falling of the catalyst or the material gas. In the case where the catalyst or the material gas is supplied to the reactor which is heated by an external heater, the temperature is higher in the wall region of the reactor closer to the heater than the center of the reactor, so that an upward flow is generated along the wall region. This upward flow is merged with a downward flow in the reactor in an upper portion of the reactor and produces convection. The convection method uses this convention to make the material gas and the catalyst to be in contact with each other in a longer time. In this way, mass production of carbon nano structures becomes possible.

However, in the case of carrying out the convection method with, for example, a vertical reactor, the following drawback occurs.

The body of a vertical reactor is generally fastened with an O-ring or the like so as to connect a flange section, which is a metal device section, on an upper portion of the reactor, with a reactor tube of quartz or the like. Because of this structure of reactor device, it is difficult to dispose an external heater serving as a high-temperature heat source in the vicinity of the portion where the supplying tube is provided. Because of such layout limitation of an external heater and also because of constant introduction of material gas, catalyst and a carrier gas, which have lower temperatures than that of the reactor, into the reactor, the temperature of the upper portion of the reactor is lower than the central portion. Therefore, because the temperature becomes lower in the upper portion than the central portion, an intense upward flow is produced, which also causes a circulating flow in the upper portion of the reactor. Consequently, the catalyst is cooled down and coagulates in the upper portion of the reactor, and the coagulated catalyst or the material gas decomposition product is adhered and accumulated in the reactor. This contamination of the reactor due to the coagulated catalyst in the upper portion of the reactor results in decrease or instability in yield in manufacturing of carbon nano structure. Moreover, it also requires a process of removing/cleaning up the coagulated catalyst or the material gas decomposition product from the upper portion of the reactor, thereby decreasing efficiency in the sequential production of carbon nano structure.

In view of the foregoing problems, an object of the present invention is to provide a production method and production device for carbon nano structure which improves efficiency in production of carbon nano structure.

Technical Solution

The present invention is made in view of the foregoing problems. One embodiment of the present invention is a production device for producing a carbon nano structure by fluidizing a material gas and a catalyst in a heated reactor so as to react the material gas and the catalyst, said production device including reaction region determining means for determining a reaction region where the material gas and the catalyst are fluidized, said determining means determining said reaction region within a heated region in said reactor.

In addition to the foregoing structure, the present invention may be arranged so that said reactor is a tube including a heater on its periphery, and said reaction region determining means sets said reaction region where the material gas and the catalyst are fluidized in said reactor so that the reaction region resides within a region having the heater.

In addition to the foregoing structure, the present invention may be arranged so that said reaction region determining means sets said reaction region where the material gas and the catalyst are fluidized in said reactor so that the reaction region resides within a region having a temperature equal to or greater than a synthesis temperature of the carbon nano structure.

In addition to the foregoing structure, the present invention may be arranged so that the temperature is 500° C.

By setting the temperature of reaction region to 500° C. or greater, the decomposition of material gas or the activation of catalyst is fully facilitated, and synthesis of carbon nano structure can be securely carried out. On the other hand, if the temperature of reaction region is less than 500° C., the decomposition of material gas or the activation of catalyst are slowed down, and synthesis of carbon nano structure is not ensured.

In addition to the foregoing structure, the present invention may be arranged so that said reaction region determining means is constituted of a regulator which serves to regulate a fluid flow into a region other than the reaction region in said reactor.

In addition to the foregoing structure, the present invention may be arranged so that said regulator is constituted of a covering body with a depression facing to the reaction region.

In addition to the foregoing structure, the present invention may be arranged so that said reaction region determining means determines the reaction region by spraying gas into the fluid flow in said reactor.

In addition to the foregoing structure, the present invention may be arranged so that wherein said reactor contains convection due to temperature variation.

The present invention may also be arranged as a production device for producing a carbon nano structure by fluidizing a material gas and a catalyst in a heated reaction region in a reactor to generate convection, so that said material gas and said catalyst are brought into contact with each other in the reaction region, said production device including reaction region determining means for determining the reaction region within said reactor.

In addition to the foregoing structure, the present invention may be arranged so that said reaction region determining means includes changing and setting means for changing a size of said reaction region.

In addition to the foregoing structure, the present invention may be arranged so that said reaction region determining means is constituted of a regulator provided on a material gas insertion end of said reactor, said regulator serving to regulate a fluid flow of the convection flowing toward the material gas insertion end of said reactor.

In addition to the foregoing structure, the present invention may be arranged so that said reaction region determining means is constituted of convection shielding means which determines the reaction region by forming a convection shielding region, said convection shielding means forming the convection shielding region by spraying gas in the presence of the convection into a circulating fluid flowing toward the material gas insertion end of said reactor.

In addition to the foregoing structure, the present invention may be arranged so that said regulator is constituted of a covering body with a depression facing to the reaction region.

In addition to any one of the foregoing structures, the present invention may further comprise heating and supplying means for supplying the material and the catalyst into said reactor while heating at least one of the material gas and the catalyst.

In addition to any one of the foregoing structures, the present invention may be arranged so that said reactor includes plural portions supplying means for supplying at least one of the material gas and the catalyst to plural portions of said reactor.

In addition to the foregoing structure, the present invention may be arranged so that said plural portions supplying means is constituted of plural supply tubes for supplying at least one of the material gas and the catalyst to plural portions in said reactor.

In addition to the foregoing structure, the present invention may be arranged so that said plural portions supplying means is constituted of a supply tube having plural outlets in plural different portions, said plural portions supplying means discharging at least one of the material gas and the catalyst from the plural outlets so as to supply the material gas and/or the catalyst to said reactor.

The present invention may also be arranged as a method for producing a carbon nano structure by fluidizing a material gas and a catalyst in a heated reactor so as to react the material gas and the catalyst, said reactor including reaction region determining means for determining a reaction region where the material gas and the catalyst are fluidized, said determining means determining said reaction region within a heated region in said reactor, said carbon nano structure being produced within the reaction region.

The present invention may also be arranged as a method for producing a carbon nano structure by fluidizing a material gas and a catalyst in a heated reaction region of a reactor to generate convection, so that said material gas and said catalyst are brought into contact with each other in the reaction region, said reactor including reaction region determining means for determining the reaction region within said reactor, said carbon nano structure being produced within the reaction region determined by said reaction region determining means.

In addition to the foregoing structure, the present invention may be arranged so that said reaction region determining means changes a size of said reaction region.

In addition to the foregoing structure, the present invention may be arranged so that a fluid flow of the convection flowing toward a material gas insertion end of said reactor is regulated by a regulator provided on the material gas insertion end of said reactor.

In addition to the foregoing structure, the present invention may be arranged so that said reaction region is determined by forming a convection shielding region, said convection shielding region being formed by spraying gas in the presence of the convection into a circulating fluid flowing toward the material gas insertion end of said reactor.

In addition to any one of the foregoing structures, the present invention may be arranged so that at least one of the material gas and the catalyst is heated when supplied into said reactor.

In addition to any one of the foregoing structures, the present invention may be arranged so that at least one of the material gas and the catalyst is supplied to plural different portions of said reactor.

In addition to any one of the foregoing structures, the present invention may be arranged so that said catalyst is a carbide catalyst.

In addition to any one of the foregoing structures, the present invention may be arranged so that said catalyst is an oxide catalyst.

Advantageous Effect

The present invention provides a production device for producing a carbon nano structure including reaction region determining means for determining a reaction region in said reactor. For example, in supplying a material gas, a catalyst and a carrier gas from an upper portion of a reactor, the reaction region determining means securely sets the reaction region within a region other than the low-temperature region which is generated in an upper portion of the reactor. On this account, the convection state is efficiently made in the reaction region, and the contamination due to adhesion or accumulation of concretion of the cooled catalyst in the upper portion of the reactor or material gas decomposition product can be prevented. The production efficiency of carbon nano structure thus increases. Further, since adhesion or accumulation of concretion of the cooled catalyst etc. in the upper portion of the reactor is prevented, the clearing process for removing the concretion etc. can be greatly simplified. Therefore efficiency of a sequential production of carbon nano structure is ensured.

In the case of using a quartz tube reactor, an increase in diameter of the quartz tube makes the temperature difference between the center and the wall of the quartz tube bigger, and further makes a gas flow in the reactor larger. However, by providing the regulator of the present invention, which is specifically explained later, in the reactor, the intensity of the gas flow can be controlled, which allows control of the synthesis time of carbon nano structure. On this account, a sufficient synthesis time is ensured even when the reaction is carried out in a short reactor. On this account, it is possible to use a short-length quartz tube reactor in mass manufacturing of carbon nano structure requiring a relatively long synthesis time. The manufacturing cost is therefore greatly reduced.

Moreover, the production device according to the present invention is not limited to a vertical CVD device, and a horizontal CVD device may also be useful if generation of convection is ensured in the reactor. Furthermore, the convection may also be generated in a reactor obliquely disposed, which is used as an oblique CVD device. Therefore, an arbitrary CVD device may be selected from one of the vertical, horizontal and oblique devices according to the target structure or the function of the production device.

In addition to the foregoing structure, according to another embodiment of the production device of the present invention, said reaction region determining means includes changing and setting means for changing a size of said reaction region. With this structure, it is possible to cope with the variation in production condition of carbon nano structure; for example, various modifications in reaction region according to the type of material gas or catalyst, the conditions of supply/introduction of material gas, catalyst, and carrier gas, or environmental condition such as the heating temperature in the reaction region. The production device of the present invention is thus superior in versatility.

In addition to the foregoing structure, according to another embodiment of the production device of the present invention, said reaction region determining means is constituted of a regulator provided on a material gas insertion end of said reactor, said regulator serving to regulate a fluid flow of the convection flowing toward the material gas insertion end of said reactor. The regulator serves to regulate the fluid flow toward the material gas insertion end of the reactor, and therefore the convection state is efficiently generated in the reaction region. The efficiency in production of carbon nano structure thus increases.

In addition to the foregoing structure, according to another embodiment of the production device of the present invention, said reaction region determining means is constituted of convection shielding means which determines the reaction region by forming a convection shielding region, said convection shielding means forming the convection shielding region by spraying gas in the presence of the convection into a circulating fluid flowing toward the material gas insertion end of said reactor. The convection shielding region serves to regulate the fluid flow entering toward the material gas insertion end of said reactor, and therefore the convection state is efficiently generated in the reaction region. The efficiency in production of carbon nano structure thus increases. Particularly, the convection shielding means according to the present invention may be easily provided in the reactor, as it forms the convection shielding region by spray of gas. Further, in any of vertical, horizontal and oblique reactors, it is possible to form the convection shielding region by heating a required region of the reactor to generate convection, and spraying gas into the circulating fluid.

In addition to the foregoing structure, the production device for producing a carbon nano structure according to the present invention may be arranged so that said regulator is constituted of a covering body with a depression facing to the reaction region. With this structure, the covering body securely blocks the fluid flow toward the low temperature region, which is generated on heating the reactor, by causing the fluid flow to be reflected by the lower face of the regulator into the center of the reactor. With this structure, the convection state is efficiently generated and the production efficiency of carbon nano structure increases.

In addition to any one of the foregoing structures, the production device for producing a carbon nano structure according to the present invention may further comprise heating and supplying means for supplying the material gas and the catalyst into said reactor while heating at least one of the material gas and the catalyst. With this structure, it is possible to prevent decrease in temperature in the vicinity of the introduction section at the time of introducing the material gas and/or the catalyst into the reactor. On this account, concretion of the cooled catalyst in the vicinity of the reaction region can be prevented, and the contamination due to accumulation of catalyst concretion or material gas decomposition product is prevented. Further, it is also possible to enlarge the reaction region to the introduction section, and the production efficiency of carbon nano structure further increases. Furthermore, since accumulation of concretion of the catalyst etc. is prevented, the clearing process for removing the concretion etc. can be simplified. Therefore efficiency of a sequential production of carbon nano structure is ensured.

In addition to any one of the foregoing structures, according to another embodiment of the production device of the present invention, said reactor includes plural portions supplying means for supplying at least one of the material gas and the catalyst to plural portions of said reactor. With this structure using the plural portions supplying means, the material gas and/or the catalyst can be distributed to the reactor more evenly than the case where the material gas and/or the catalyst is supplied by a single supply means from only one portion. Therefore the material gas and/or the catalyst can be distributed to the reaction region more evenly, and the material gas and the catalyst are reacted in the whole reaction region in the presence of the convection state. This ensures mass production of carbon nano structure.

In addition to the foregoing structure, the production device for producing a carbon nano structure according to the present invention may be arranged so that said plural portions supplying means is constituted of plural tubes for supplying at least one of the material gas and the catalyst to plural portions in said reactor. With this structure using the plural supply tubes, the material gas and/or the catalyst can be distributed to the reactor more evenly than the case where the material gas and/or the catalyst is supplied by a single supply means from only one portion. Therefore the material gas and/or the catalyst can be distributed to the reaction region more evenly, and the material gas and the catalyst are reacted in the whole reaction region in the presence of the convection state. This ensures mass production of carbon nano structure.

In addition to the foregoing structure, the production device for producing a carbon nano structure according to the present invention may be arranged so that said plural portions supplying means is constituted of a tube having plural outlets in plural different portions, said plural portions supplying means discharging at least one of the material gas and the catalyst from the plural outlets so as to supply the material gas and/or the catalyst to said reactor. With this structure using the supply tube having the plural outlets, the material gas and/or the catalyst can be distributed to the reaction region more evenly, and the material gas and the catalyst are reacted in the whole reaction region in the presence of the convection state.

In addition to the foregoing structure, the present invention may be arranged as a method for producing a carbon nano structure, said reactor including reaction region determining means for determining the reaction region within said reactor, said carbon nano structure being produced within the reaction region determined by said reaction region determining means. With this structure, on introduction of the material gas and the catalyst into the reactor, the reaction region determining means securely sets the reaction region within a region other than the low-temperature region which is generated in an upper portion of the reactor. On this account, the convection state is efficiently made in the reaction region.

In addition to the foregoing structure, according to another embodiment of the production method of the present invention, said reaction region determining means changes a size of said reaction region. With this structure capable of changing the size of the reaction region, it is possible to, for example, change the reaction region according to the production condition of carbon nano structure which is determined depending on the type of material gas or catalyst, the conditions of supply/introduction of material gas, catalyst, and carrier gas, or environmental condition such as the heating temperature in the reaction region. The present invention thus copes with the variation in production condition of carbon nano structure.

In addition to the foregoing structure, according to another embodiment of the production method of the present invention, a fluid flow of the convection flowing toward a material gas insertion end of said reactor is regulated by a regulator provided on the material gas insertion end of said reactor. With this structure, the fluid flow toward a material gas insertion end of the reactor is regulated by the regulator, and therefore the convection state is efficiently generated in the reaction region. The efficiency in production of carbon nano structure thus increases.

In addition to the foregoing structure, according to another embodiment of the production method of the present invention, said reaction region is determined by forming a convection shielding region, said convection shielding region being formed by spraying gas in the presence of the convection into a circulating fluid flowing into an end of said reactor where the material gas is introduced. The convection shielding region serves to regulate the fluid flow toward a material gas insertion end of the reactor, and therefore the convection state is efficiently generated in the reaction region. The efficiency in production of carbon nano structure thus increases.

In addition to any one of the foregoing structures, according to another embodiment of the production method of the present invention, at least one of the material gas and the catalyst is heated when supplied into said reactor. With this structure, it is possible to prevent decrease in temperature in the vicinity of the introduction section at the time of introducing the material gas and or the catalyst into the reactor. On this account, concretion of the cooled catalyst in the vicinity of the reaction region can be prevented, and the contamination due to accumulation of catalyst concretion or material gas decomposition product is prevented. Further, it is also possible to enlarge the reaction region to the introduction section, and the production efficiency of carbon nano structure further increases.

In addition to any one of the foregoing structures, the production method for carbon nano structure according to the present invention may be arranged so that at least one of the material gas and the catalyst is supplied to plural different portions of said reactor. With this structure in which at least one of the material gas and the catalyst is supplied to plural different portions of said reactor, the material gas and/or the catalyst can be distributed to the reactor more evenly. Therefore the material gas and/or the catalyst are more efficiently reacted in the whole reaction region in the presence of the convection state than the case where the material gas and/or the catalyst is supplied from only one portion.

In addition to any one of the foregoing structures, the production method for carbon nano structure according to the present invention may be arranged so that said catalyst is a carbide catalyst. Therefore, the reaction of the material gas and the multicomponent catalyst is carried out in the reaction region in which the convection state is efficiently produced. This ensures mass production of carbon nano structure.

In addition to any one of the foregoing structures, the production method for carbon nano structure according to the present invention may be arranged so that said catalyst is an oxide catalyst. Therefore, the reaction of the material gas and the oxide catalyst is carried out in the reaction region in which the convection state is efficiently produced. This ensures mass production of carbon nano structure.

BRIEF DESCRIPTION OF DRAWINGS

[FIG. 12] A schematic structure view showing still another regulator according to the present invention.

[FIG. 15] A table showing an experiment result of Examples and Comparative Examples of FIG. 14.

REFERENCE NUMERALS

Figure 1:
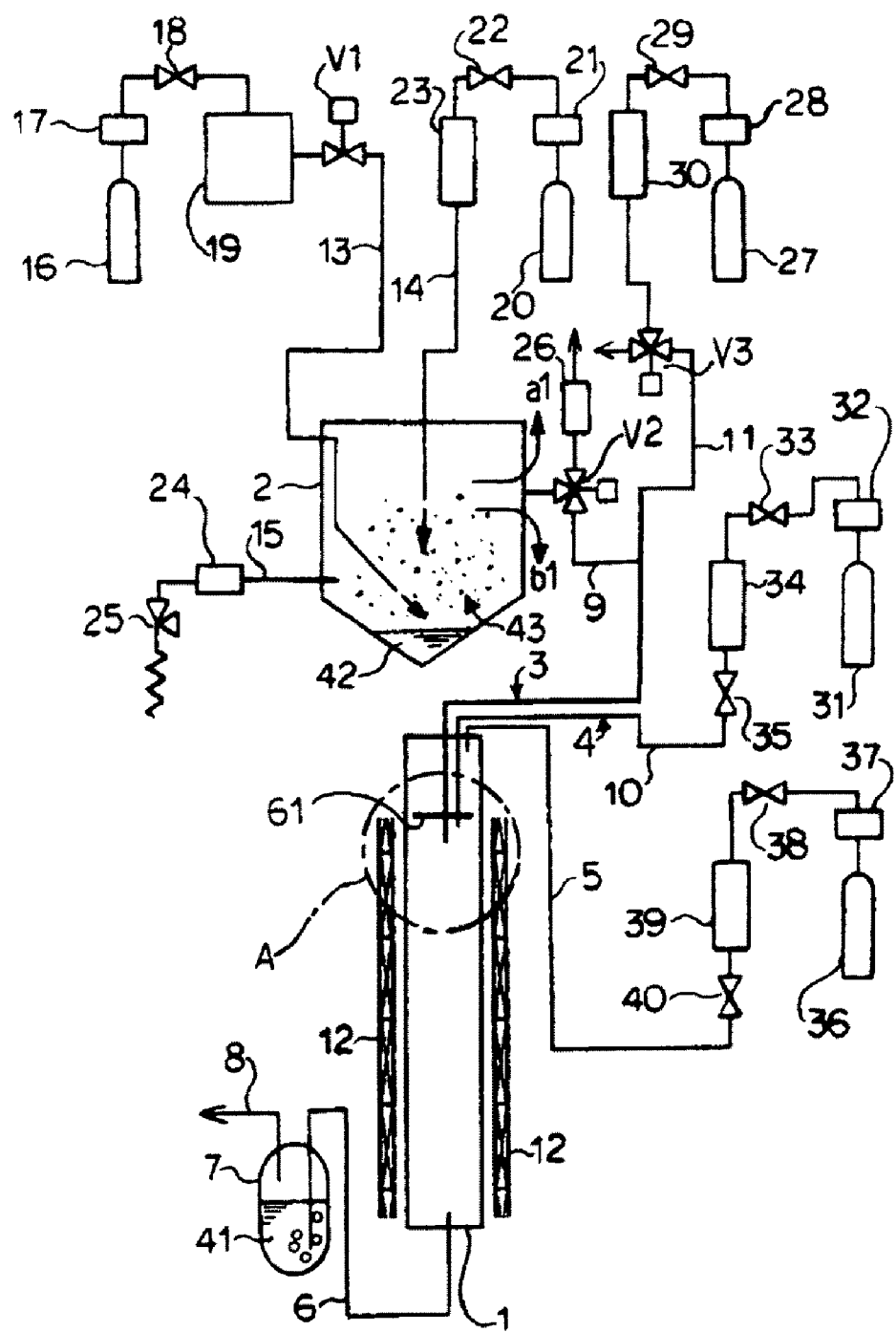
[FIG. 1] A schematic structure view showing an entire structure of a production device for a carbon nano structure, according to one embodiment of the present invention.

1: reactor
1a: flange
2: catalyst storage tank
3: catalyst supplying tube path
4: material supplying tube path
5: gas introduction path
6: discharge path
7: collection tank
8: discharge tube
9: catalyst supplying tube
10: material gas supplying tube
11: gas supplying path
12: heat applicator
13: high-pressure pulse gas introduction tube
14: gas introduction path
15: gas discharge tube
16: helium compressed gas cylinder
17: flow rate regulator
18: open/close valve
19: high-pressure pulse gas generation/storage section
20: helium compressed gas cylinder
21: flow rate regulator
22: open/close valve
23: gas flow rate controller
24: filter
25: safe valve
27: helium compressed gas cylinder
27a: helium compressed gas cylinder
28: flow rate regulator
29: open/close valve 29
30: gas flow rate controller
30a: gas flow rate controller
31: material compressed gas cylinder
32: flow rate regulator
33: open/close valve
34: gas flow rate controller
35: open/close valve
36: helium compressed gas cylinder
37: flow rate regulator
38: open/close valve
39: gas flow rate controller
41: acetone
42: catalyst material powder
50: automatic valve control section
51: sequencer
60: preheater
61: convection regulator
61a: convection regulator
61b: convection regulator
70: supplying tube
71: supplying tube
72: regulator
72a: regulator
72b: air hole
73: outlets
74: flow rate intensity
75: supplying tube
76: outlets
77: outlets
78: outlets
79: outlets
80: outlets
81: supplying tube
82: supplying tube
83: supplying tube
a: gas flow inlet
b: gas flow outlet
c: low temperature region boundary
G: acetylene gas
H: helium gas S: catalyst
Z: outlets
V1: electromagnetic open/close valve
V2: electromagnetic three-way valve
V3: electromagnetic three-way valve
V10 to V30: flow rate

BEST MODE FOR CARRYING OUT THE INVENTION

With reference to the attached drawings, the following describes an embodiment of a production device for a carbon nano structure such as a carbon nanocoil, according to the present invention, and also an embodiment of a production method of a carbon nano structure using the production device.

FIG. 1 shows the entire structure of a production device for a carbon nano structure, according to the present invention. This production device carries out a CVD method using catalyst vapor-phase transfer.

Figure 2:
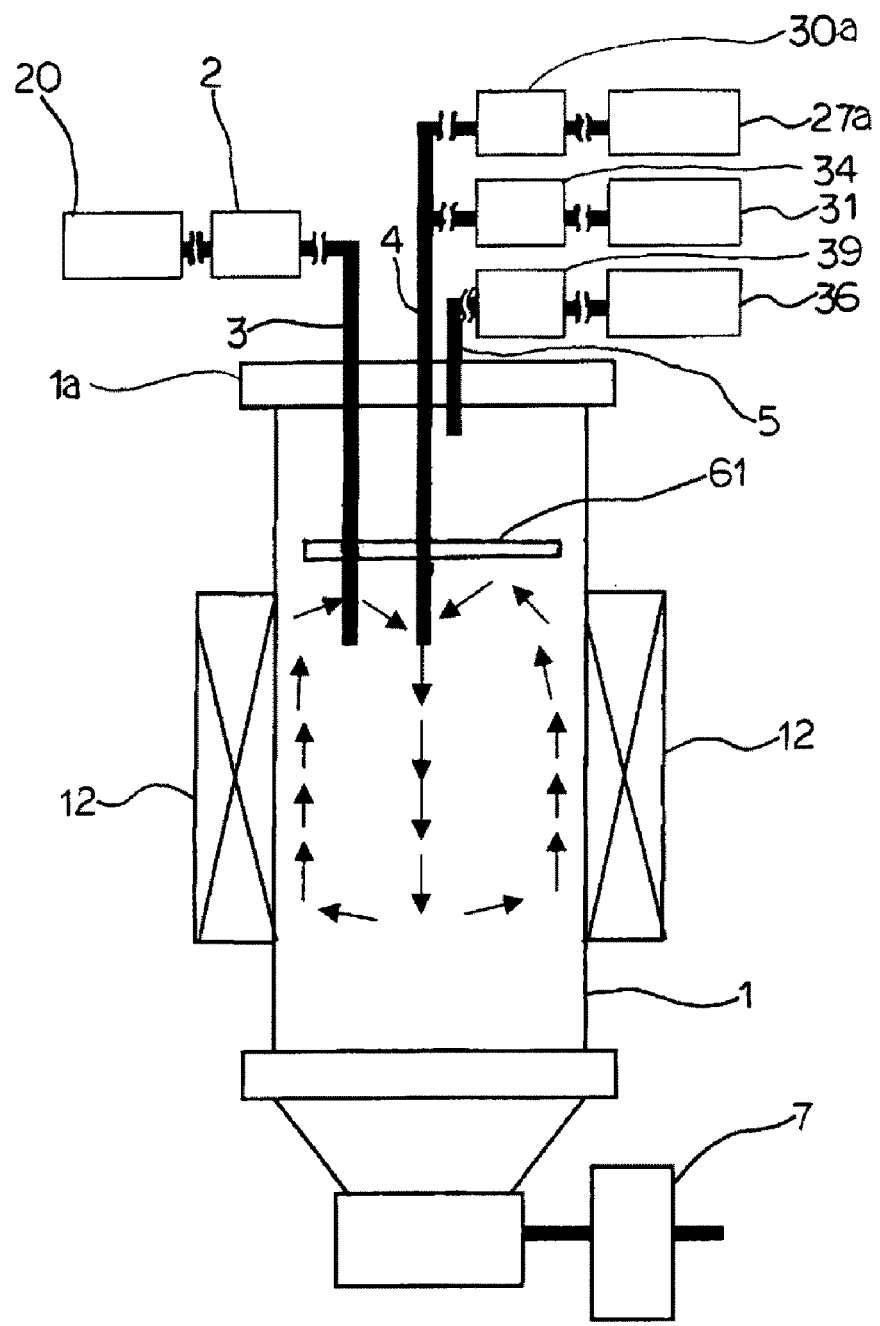
[FIG. 2] A magnified schematic explanatory view of "A" in FIG. 1.

A reactor 1 is constituted of a vertical quartz tube, and includes on its periphery a heat applicator 12 for thermally decomposing a material gas. The heat applicator 12 extends along the vertical longitudinal direction of the reactor 1. A catalyst and a material gas are introduced to the reactor 1 via a catalyst supplying tube path 3 and a material supplying tube path 4, together with a carrier gas. FIG. 2 minutely shows a section "A" in the vicinity of the introduction sections of the catalyst supplying tube path 3 and the material supplying tube path 4 which extend into the reactor. The catalyst supplying tube path 3 is made of a catalyst supplying quartz tube 9, and the material supplying tube path 4 is made of a material gas supplying quartz tube 10. The quartz tube of the reactor 1 is attached to a SUS flange 1a (See FIG. 2) which is disposed on an upper portion of the reactor and serves as a lid member. The quartz tube and the flange 1a are sealed by an O-ring. The catalyst supplying tube path 3 and the material supplying tube path 4 are introduced into the reactor through the flange 1a. The outlet ends of the catalyst supplying tube path 3 and the material supplying tube path 4 extend into the installation region of the heat applicator 12 that corresponds to the reaction region in the reactor. A convection regulator 61 made of a flat quartz plate is attached to the bottom ends of the catalyst supplying tube path 3 and the material supplying tube path 4 by a movement mechanism (not shown), facing to the reaction region of the reactor. The movement mechanism makes the convection regulator 61 vertically movable. The movement mechanism may be realized by an arbitrary machine component. For example, the movement mechanism may be a chain which suspends the convection regulator 61 from an upper portion of the reactor. The material of the movement mechanism is not particularly limited, but a material having a certain heat-resistance, such as metal or ceramic is preferable.

The convection regulator 61 serves as a cover for stopping an upward flow generated in the reactor 1, blocking the upward flow from reaching the upper end of the reactor 1. As shown in FIG. 2, a part of the center flow of the convection flowing downward goes up again along the wall of the reactor due to such a temperature gradient that the temperature is high in the wall of the reactor than the center thereof. This upward flow of the convection is reflected by the lower face of the convection regulator 1. In this way, the convection regulator 61 allows the upward flow to efficiently flow into the reaction region into the reactor beneath. This arrangement ensures generation of appropriate convection in the reaction region of the reactor.

In addition to the catalyst supplying tube path 3 and the material supplying tube path 4, a gas introduction path 5 is introduced into the reactor 1 through the flange 1a to supply a carrier gas to the reactor. In the case of a vertical reactor, since a catalyst and a material gas are introduced from an upper portion of the reactor, and, as described, since the layout of the reactor makes it difficult to dispose an external heater serving as a high-temperature heat source in the vicinity of the portion where the supplying tube is provided, the temperature becomes lower in the upper portion than the lower portion, and convection including an intense upward flow is produced. The upward flow of gas blocks smooth downward flows of the catalyst and the material gas. To solve this problem, 3 slm of helium gas serving as a carrier gas is supplied via the gas introduction path 5 to suppress the upward flow due to the convection, thereby efficiently facilitating growth reaction of carbon nano structure. This upward flow suppressing gas supplying means is constituted of a helium compressed gas cylinder 36, a flow rate regulator 37 provided on the gas-discharge end of the helium compressed gas cylinder 36, an open/close valve 38, a gas flow rate controller 39 made of a mass flow controller, and the gas introduction path 5.

The following explains validation result of two fluid models with and without the convection regulator 61 in the reactor 1.

Figure 3:
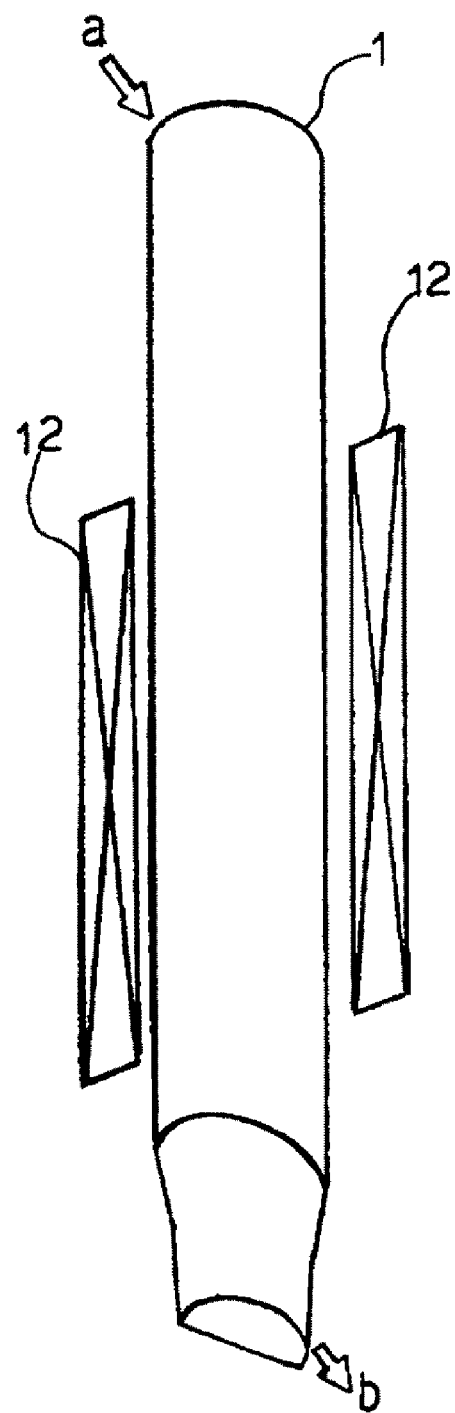
[FIG. 3] A schematic view of a reactor, which is an comparative example used for explanation of a regulator according to the present invention.
Figure 4:
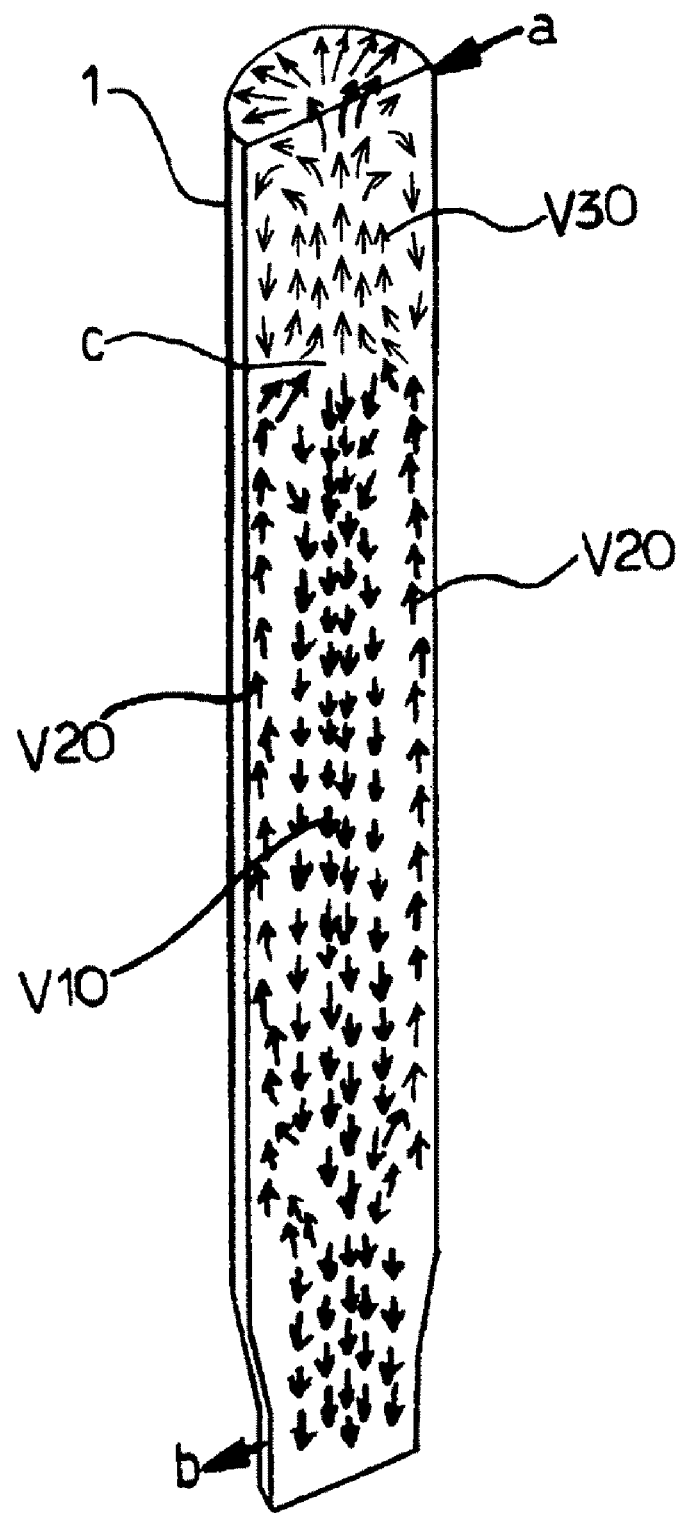
[FIG. 4] A schematic view of a flow rate distribution in a reactor according to the Comparative Example of FIG. 3.

FIG. 3 is a schematic view showing a reactor 1 not having a convection regulator, as a comparative example. In this fluid model, the reactor 1 is heated by the external heat applicator 12 so that the central portion is heated to 700° C., and an acetylene gas serving as a material gas is supplied from a gas flow inlet "a" on an upper portion of the reactor, together with helium gas serving as a carrier gas. Then the resultant gas is discharged from a gas flow outlet "b" on the bottom end of the reactor. The fluid is a mixture gas of 23 vol % acetylene gas and 77 vol % carrier gas, and the flow rate is 6 slm. The temperature of the mixture gas is 20° C. FIG. 4 shows a flow rate distribution in the reactor for this fluid model. The inner portions of the reactor corresponding to the heat applicators 12 serve as reaction regions for producing carbon nano structures. The temperature gradient becomes more significant in a portion more distant from the wall having the heat applicator 12, that is, closer to the internal radius, and therefore an upward flow is generated along the wall, and a downward flow is generated in the vicinity of the center of the reactor. As a result, convention is generated in the reaction region which is drawn into the center of the reactor.

In the low temperature region formed on an upper portion of the reactor 1, a fluid flow which is not to be merged with the convection in the reaction region is generated, and this fluid flow causes adherence of catalyst concretion etc. into the upper inner wall which contaminates the reactor. Further, in the case of not using the regulator, a downward flow is generated in the center of the reactor 1, whose flow rate (V10: see the flow rate distribution measurement of FIG. 4) is about 1 m/s, which is faster than the upward flow near the wall whose flow rate V20 (about 0.2 to 0.8 m/s). Such a fast downward flow is not desirable because it decreases the contact time of catalyst. Note that, as shown in FIG. 4, the flow rate V30 of the upward flow in the low temperature region boundary "c" on an upper portion of the reactor 1 is about 0.8 m/s, which is comparable to the convection in the reaction region.

Further, since a part of the convection in the low temperature region formed on an upper portion of the reactor 1 constantly flows into an upper portion of the reaction region in the reactor 1, the temperature of the upper portion of the reaction region changes every second, that is, not stable. The temperature in the upper portion of the reaction region was found in a range of about 550 to 660° C., which was measured by a thermocouple meter.

As described, as long as the temperature of the reaction region is not less than 500° C., the decomposition of material gas and/or activation of catalyst is sufficiently facilitated, and synthesis of carbon nano structure is secured. Therefore, the synthesis of carbon nano structure is possible without a convection regulator, as in the case of FIG. 3.

However, because of the layout limitation of the external heater and also because of constant introduction of a low temperature material gas, catalyst and a carrier gas of which temperature is lower than the reactor, the temperature of the upper portion of the reactor is lower than the central portion. Accordingly, when the convection regulator is not used, an intense upward flow is produced, which causes a circulating flow in the upper portion of the reactor. Consequently, the catalyst is cooled down and coagulates in the upper portion of the reactor. This may cause contamination of the reactor or decrease or instability in yield in manufacturing of carbon nano structure.

Note that, the measurement result of the temperature in the reactor 1 according to the present embodiment showed that the convection in the reactor 1 becomes particularly intense when the temperature difference between the center and the upper portion of the reactor 1 is in a range of about 60 to 170° C.

On the other hand, the production device of the present invention using a regulator such as the convection regulator 61 solves the foregoing defect of contamination due to the low temperature region formed on the upper portion of the reactor 1, thereby increasing the contact time of catalyst. Such advantage by the use of the regulator is minutely discussed below with reference to some drawings including FIG. 5.

Figure 5:
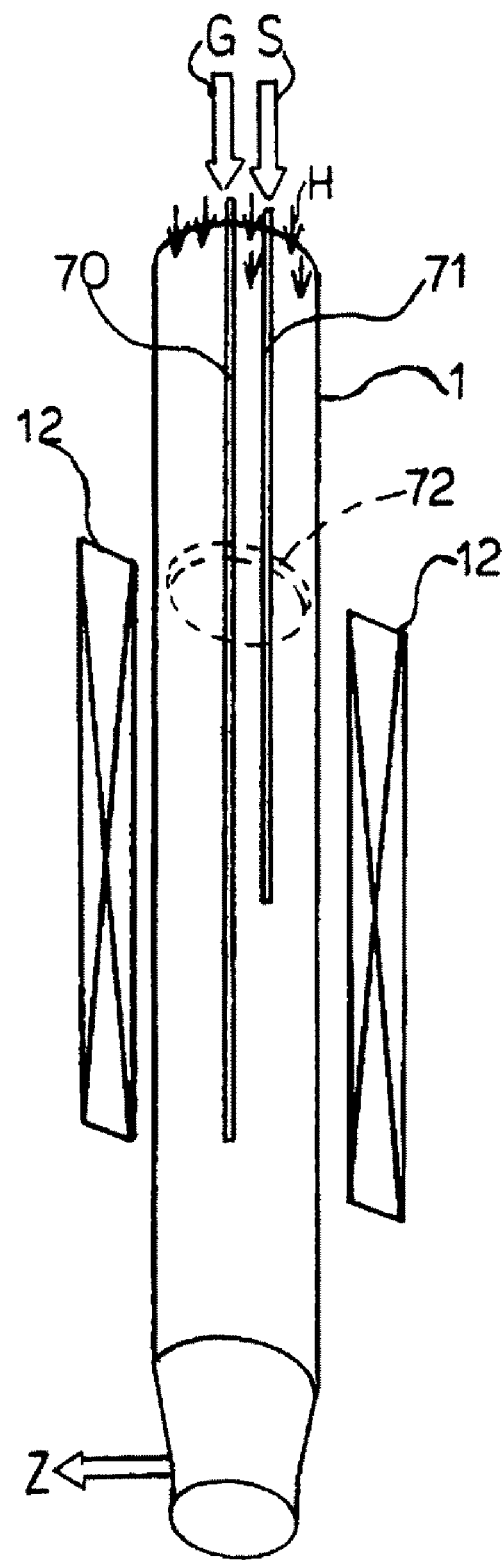
[FIG. 5] A schematic view of a reactor for explaining a regulator according to the present invention.
Figure 6:
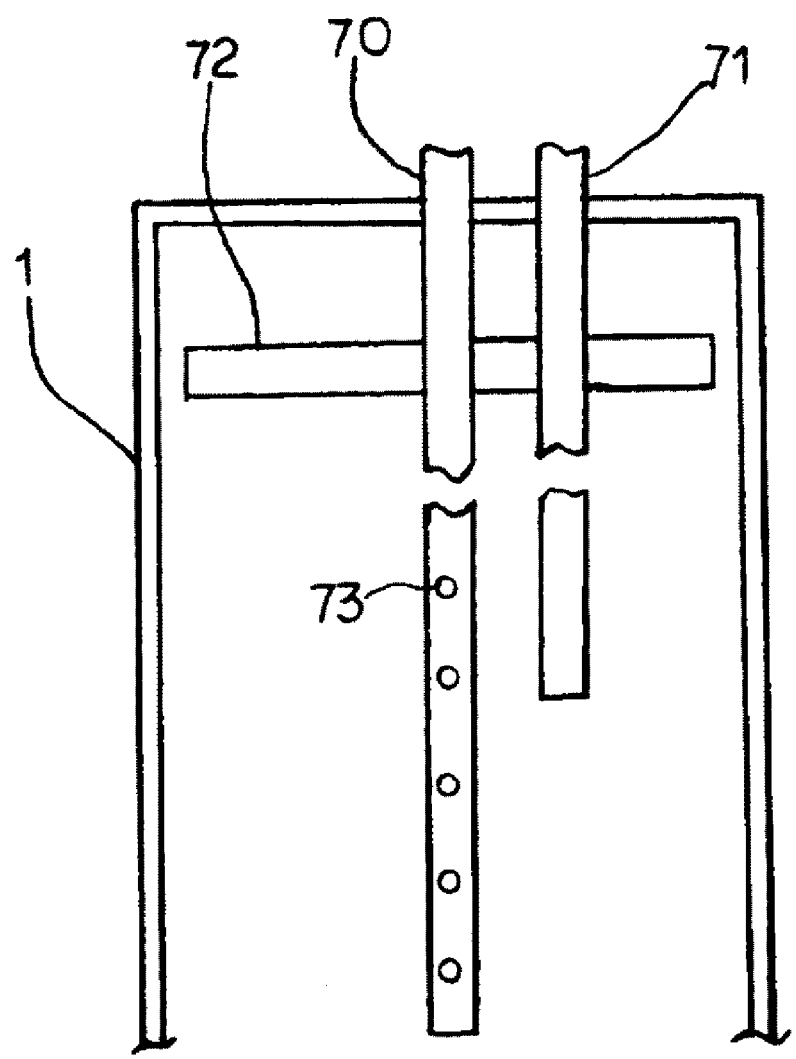
[FIG. 6] A schematic view of an upper portion of a reactor, showing a supplying tube used for the reactor of FIG. 5.

FIG. 5 shows a fluid model using a disk-shaped regulator 72 whose external diameter is smaller than the internal diameter of the reactor body of the reactor. The reactor 1 is heated by the external heat applicator 12 as with the model of FIG. 3 so that the central portion is heated to 700° C. As shown in FIG. 15, a porous supplying tube 70 is provided to supply acetylene gas G to a reaction region corresponding to the location of the heat applicator 12, together with a helium serving as a carrier gas in this fluid model. The porous supplying tube 70 includes a plurality of outlet holes 73, which are formed in the halfway of the tube path. With such a porous supplying tube 70, it becomes possible to efficiently supply the material gas to the reaction region. The fluid is the same as that of FIG. 3, that is, the mixture gas of 23 vol % acetylene gas and 77 vol % carrier gas whose flow rate is 6 slm. Together with the helium carrier gas, the catalyst S is discharged to be supplied to substantially the center of the reaction region through the supplying tube 71 adjacent to the porous supplying tube 70. The flow rate at this time is 1 slm. H denotes the helium carrier gas which prevents the upward flow of gas due to the convection. The flow rate is 3 slm. A regulator 72 is provided in the vicinity of the upper end of the portion where the heat applicator 12 is provided. Note that, as in the case of FIG. 3, the gas discharged from the outlet "Z" on the lower end of the reactor 1 is collected. The catalyst supplying tube 71 may also be made of a porous tube as with the porous supplying tube 70. In this case the supplying becomes more efficient.

Figure 7:
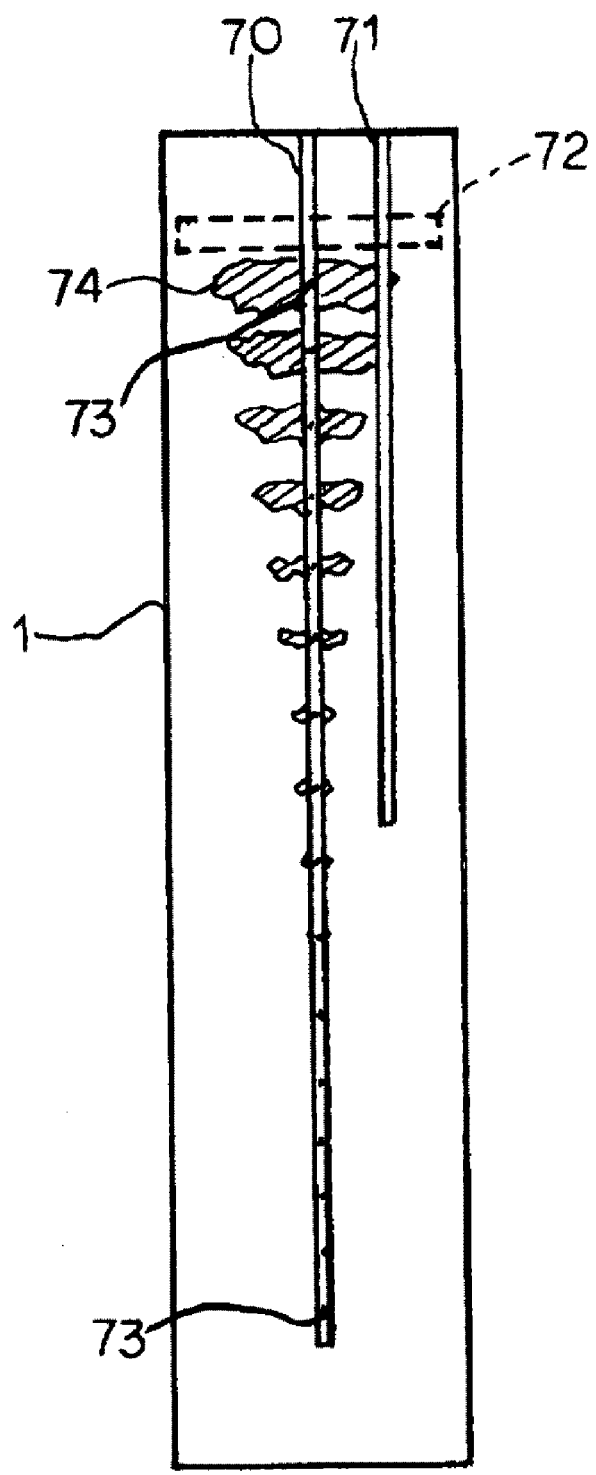
[FIG. 7] A flow rate distribution view showing flow rate distribution of gas discharged from the supplying tube of FIG. 6.
Figure 8:
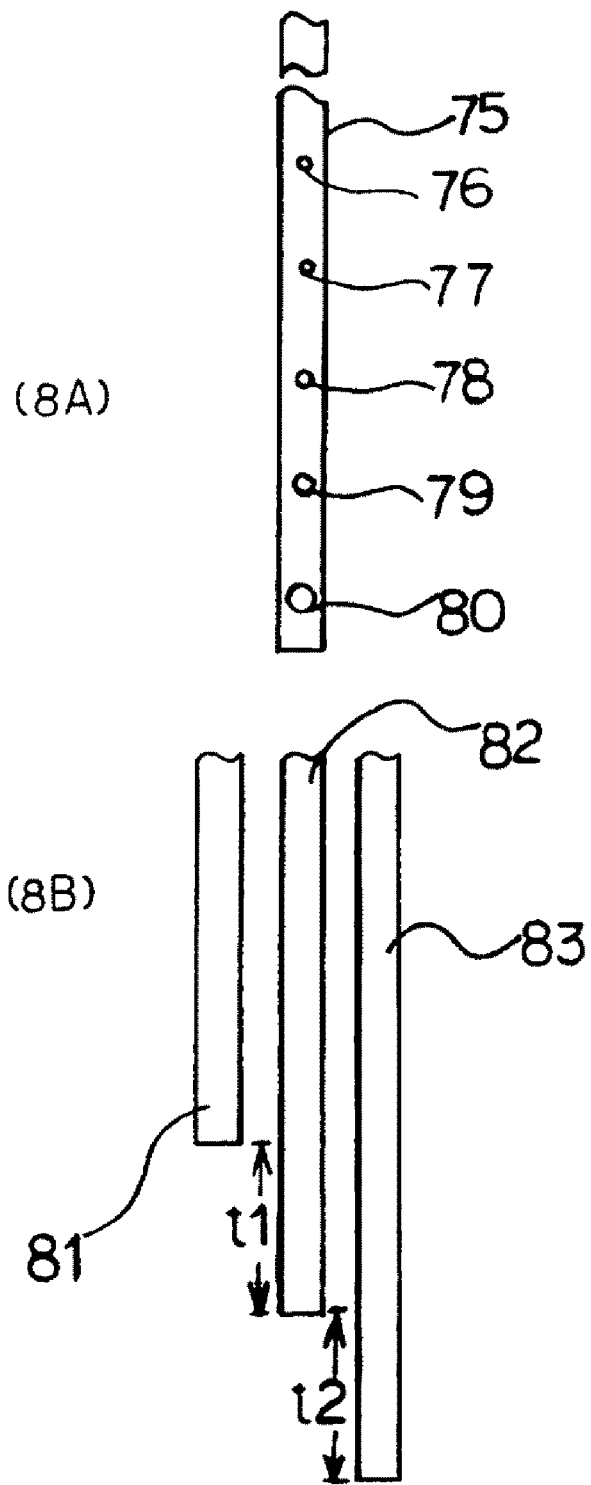
[FIG. 8] A schematic structure view showing a supplying tube and a supplying device according to the present invention.

FIG. 7 shows flow rate distribution of the gases discharged from the plurality of outlet holes 73 of a porous supplying tube 70. The hatching part 74 in FIG. 7 expresses a flow rate intensity. As shown in the flow rate distribution, the gas is discharged more intensively from the outlet holes 73 in the vicinity of the regulator 72 than the outlet holes 73 in the lower portion. FIG. 8 shows an alternative structure for a supplying tube or device which can more evenly supply a material gas or a catalyst along the vertical direction of the reaction region. The supplying tube 75 (8A), a modification of porous supplying tube 70, has plural outlet holes 76 to 80 with different sizes of openings. The outlet hole 76 has the smallest opening and then the size increases in order of higher to lower part of the supplying tube. With such variation in size of plural outlet holes that an outlet closer to the bottom has a larger hole, the lower outlet has a larger discharge amount. With this arrangement, the discharge amount becomes even between the upper part and the lower part of the reactor, and it becomes possible to supply a constant amount of material or catalyst. Note that, the discharge amount may be adjusted by a different way, for example, by changing the layout pitch of outlet holes 76 to 80 so that the pitch becomes smaller as the number increases, i.e., as the hole comes closer to the bottom.

FIG. 8 shows an alternative supplying device (8B) which is constituted of supplying tubes 81 to 83 with discharge ends at different locations. The locations of their discharge ends differ in terms of height in the vertical direction in the reaction region. The intervals t1 and t2 are made between the supplying tubes 81 and 82, and between 82 and 83, respectively. The supplying tubes 81 to 83 are identical in diameter, so that these tubes discharge gases into different portions of the reaction region at the same speed. In this way a constant amount of material and/or catalyst may be supplied to the reactor.

Figure 9:
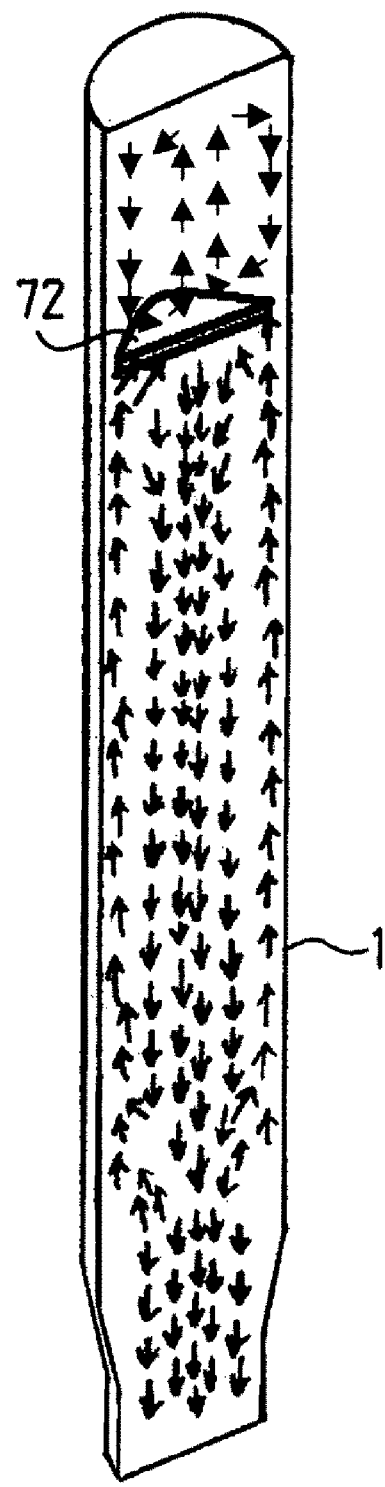
[FIG. 9] A schematic view of flow rate distribution of a reactor using a regulator according to the present invention.
Figure 10:
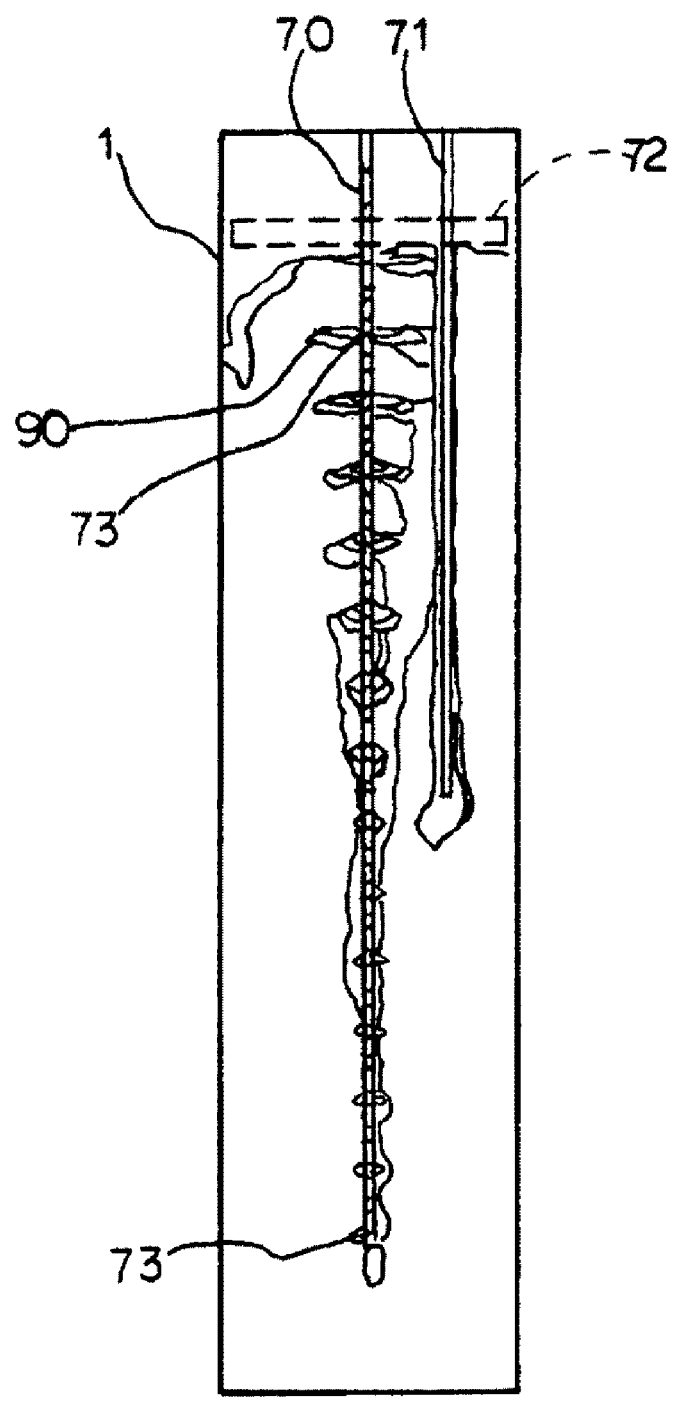
[FIG. 10] A schematic view of gas concentration distribution of a reactor using a regulator according to the present invention.

FIGS. 9 and 10 shows flow rate distribution and fluid concentration distribution of the foregoing model, respectively. Beneath the regulator 72, convection constituted of an upward flow on the wall and a downward flow in the center is generated. Also, small convention is generated above the regulator 72. The flow rate in this model is smaller than the range of 0.2 to 0.8 m/s, which is the flow rate of the model not using the regulator 72; specifically the flow rate is 0.1 to 0.2 m/s in the center and in the vicinity of the wall, which is significantly low. As explained, with the use of the regulator 72, the upward flow is reflected by the regulator 72 to travel downward, forming a circulating flow. It is thus possible to form smooth convection without stagnation of convection caused by low temperature region. Accordingly, the reaction region of the reactor may be securely kept at a desired temperature. With this advantage the present invention enables efficient supply of material gas and catalyst to the reaction region, thereby securing mass production of carbon nano structure.

Inside the reactor, the material gas and the catalyst form the convection constituted of the upward flow and the circulating flow, and are circulated in the reactor for several minutes. In the convection, it is assumed that carbon nano structures are synthesized and gradually increased in weight and finally fall. In other words, the production device of the present invention decreases the flow rate in the center and in the vicinity of the wall by the use of the regulator 72, which makes the material gas and the catalyst stay longer in the reactor, thereby ensuring an effect of facilitating the synthesis of carbon nano structure.

Note that, according to a result of computer simulation calculation, generation of convention becomes efficient when the difference in temperature between the central portion (low temperature portion) in the reactor and the wall portion (high temperature portion) falls approximately in a range of 85 to 115° C.

FIG. 10 shows a measurement result of concentration distribution of the material gas supplied to the reactor. The concentration, which is expressed by "90" is slightly thick in the upper portion, but otherwise is even around 13%. This shows that the speed in supplying the material gas or catalyst may be decreased with facilitation of generation of circulating flow. On this account, the contact time of the material gas and the catalyst may be increased in the production of carbon nano structure using convection. This method thus improves efficiency of production of carbon nano structure.

Figure 11:
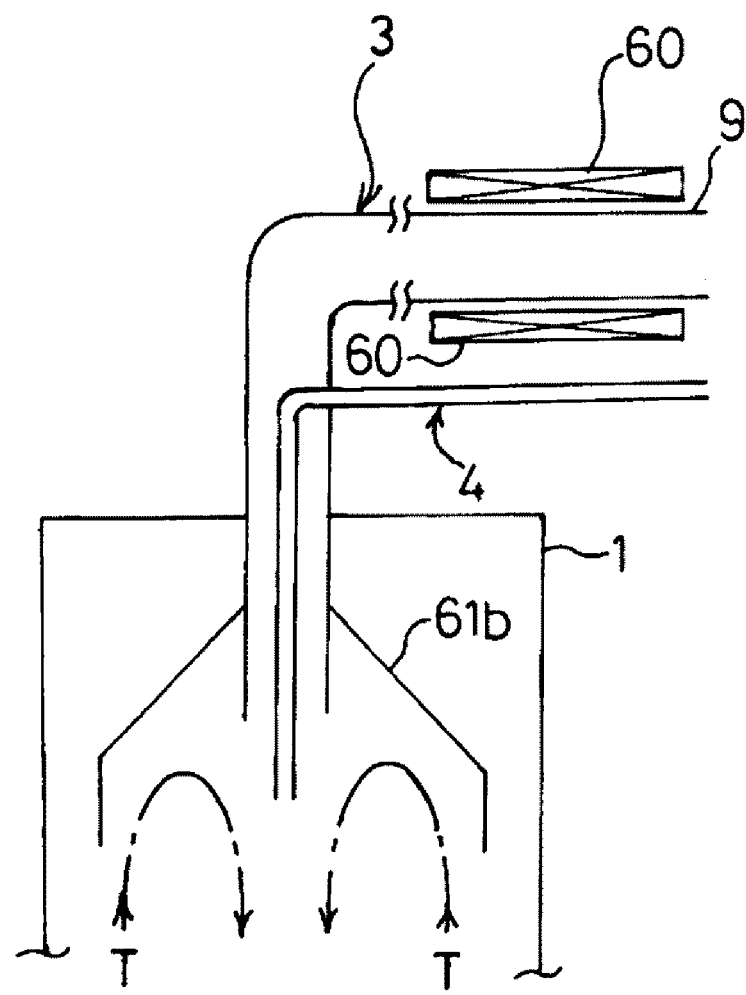
[FIG. 11] A schematic structure view showing another regulator according to the present invention.

Apart from the disk-shaped regulator 72, the regulator according to the present invention may be realized by an umbrella-shaped convection regulator 61b (shown in FIG. 11). FIG. 11 shows a double-structure tube in which the material gas supplying quartz tube 10 of the material supplying tube path 4 is incorporated in the catalyst supplying quartz tube 9 of the catalyst supplying tube path 3. Further, on a part of the periphery of the catalyst supplying tube 9, a preheater 60 is provided for preheating the catalyst and the carrier gas distributed in the tube. To prevent severe decrease of temperature on the introduction section of a carrier gas and a catalyst on an upper portion of the reactor due to introduction of catalyst and carrier gas at room temperature through the catalyst supplying tube 9, the carrier gas and the catalyst are heated by the preheater 60 before they are supplied to the gas introduction section. The temperature of preheating is preferably close to the heating temperature in the reaction region of the reactor 1. In consideration of durability of the catalyst supplying tube 9, the temperature may be lower than the heating temperature in the reactor. However, the highest temperature within an appropriate temperature range is preferably used. Further, in addition to the catalyst, the material gas or carrier gas may also be heated in advance. A method of heating only the material gas is also acceptable depending on the equipment. Furthermore, not limited to the catalyst supplying tube 9, the whole of the catalyst storage tank 2 (described later) may be heated. Moreover, heating of the carrier gas may be performed by a preheater in a gas supplying path 11 (described later).

The discharge end of the material gas supplying tube 10 is jutting out of the center of the discharge end of the catalyst supplying tube 9. A convection regulator 61b, which is constituted of a covering body with a depression facing to the reaction region, is attached to the discharge end of the catalyst supplying tube 9. The convection regulator 61b is made of an umbrella shape quartz and serves as a cover to stop an upward flow "T" generated in the reactor 1 so that the upward flow T does not reach the upper end of the reactor 1. With its umbrella shape, the convection regulator 61 makes upward flow "T" to be reflected by its internal depression, thereby circulating the upward flow "T" to efficiently flow into the reaction region in a lower portion of the reactor. It is thus possible to produce appropriate convection state in the reaction region of the reactor.

Further, apart from the mechanism member such as the disk-shaped regulator 72 and the umbrella shape convection regulator 61, the regulator means of the present invention may be realized by providing a convection shielding region in order to determine the reaction region. The shielding region is formed as follows in the case of supplying 1 slm of carrier gas from a supplying tube 71, for example, as shown in FIG. 5, 3 slm of helium gas "H" or the like greater in gas pressure than the carrier gas is blown into the entire cross-section of the reactor from an upper portion of the reactor so as to apply the helium gas "H" to the circulating fluid in the reactor. With this gas convection shielding region, it is not necessary to incorporate a mechanism member in the reactor. With this arrangement, the determining means of the reaction region can be simplified. Further, as shown in FIG. 12, to fluidize only the carrier gas in the reactor, a plurality of air holes 72b may be provided on the disk-shaped regulator 72a. The (12A) of FIG. 12 is a plan view of a porous regulator 72a, and the (12B) is a cross-sectional view taken along the line C-C of (12A). This porous regulator 72a allows adjustment of the amount of fluidized fluid according to the position/number of the air holes 72b.

As explained below, the production device according to the present embodiment includes a catalyst supplying structure for supplying catalyst particles of certain range of diameter to the reactor 1.

The dispersed catalyst and the material gas supplied from the material supplying tube path 4 come in contact with each other in the thermal atmosphere given by heat applicator 12 in a gas phase, and are decomposed by heat. As a result, a part of the material gas is converted into a carbon nano structure on the surfaces of the catalyst microparticles; that is, carbon nano structures begin to grow on the surface of the catalyst. The material gas supplying tube 10 constitutes material gas supplying means with a helium compressed gas cylinder 31, a flow rate regulator 32 provided on the gas-discharge end of the helium compressed gas cylinder 31, an open/close valve 33, a gas flow rate controller 34 made of a mass flow controller, and an open/close valve 35.

Note that, though it is not shown in FIG. 1, gas supplying means constituted of the helium compressed gas cylinder 27a, a flow rate regulator provided on the gas discharge end of the helium compressed gas cylinder 27a, an open/close valve, a gas flow rate controller made of a mass flow controller is provided to supply a carrier gas into the material gas supplying tube 10 which is required in supplying a material gas. This carrier gas for supplying a material gas enables adjustment of the spraying amount of material gas into the reactor from the discharge end nozzle of the material supplying tube path 4, which serves as an outlet nozzle. Apart from hydrocarbon, suitable examples of the material gas include a sulfur-containing organic gas, phosphorous-containing organic gas, or any other organic gases useful for generation of specific carbon nano structure.

The hydrocarbon is suitable in a sense that it does not generate unwanted substances. Examples of hydrocarbon include an alkane compound such as methane, ethane, etc., alkene compound such as ethylene, butadiene, etc.,; an alkine compound such as acetylene; an aryl hydrocarbon compound such as benzene, toluene, styrene, etc.; aromatic hydrocarbon compound with a condensed ring such as indene, naphthalene, phenanthrene, etc.; a cycloparaffin compound such as cyclopropane, cyclohexane, etc.; a cycloolefin compound such as cyclopentene; and an alicyclic hydrocarbon compound having a condensed ring such as steroid. Further, a mixture hydrocarbon gas made of two or more kinds of the foregoing gases may also be used. Among the various hydrocarbons, particularly preferred are low-molecular-weight hydrocarbons such as acetylene, arylene, ethylene, benzene, and toluene.

A discharge path 6 is provided on a lower end of the reactor 1. The discharge end of the discharge path 6 is introduced to the collection tank 7. The collection tank 7 contains an acetone 41. Unreacted material gas or carrier gas which did not contribute to the growth reaction of carbon nano structure and carrier gas is distributed in the acetone 41 of the collection tank 7, and then is discharged from the discharge tube 8 of the collection tank 7. The carbon nano structure having been produced in the reactor 1 is discharged from the discharge path 6, and then the carbon nano structure undissolved to the acetone 41 is collected is dispersed and accumulated in the acetone of the collection tank 7 by the bubbling method.

The carbon nano structure having been collected to the collection tank 7 is taken out by removing the acetone.

The catalyst storage tank 2 serves as a catalyst containing section for selecting the particle diameter of catalyst microparticles. The catalyst storage tank 2 is filled with about 50 g of catalyst material powder 42. The catalyst storage tank 2 therein contains a high-pressure pulse gas introduction tube 13 for suspending the catalyst. A helium compressed gas cylinder 16, a flow rate regulator 17 provided on the gas-discharge end of the helium gas compressed cylinder 16, an open/close valve 18, a high-pressure pulse gas generation/storage section 19, an electromagnetic open/close valve V1 and the high-pressure pulse gas introduction tube 13 constitute catalyst suspending means.

Figure 13:
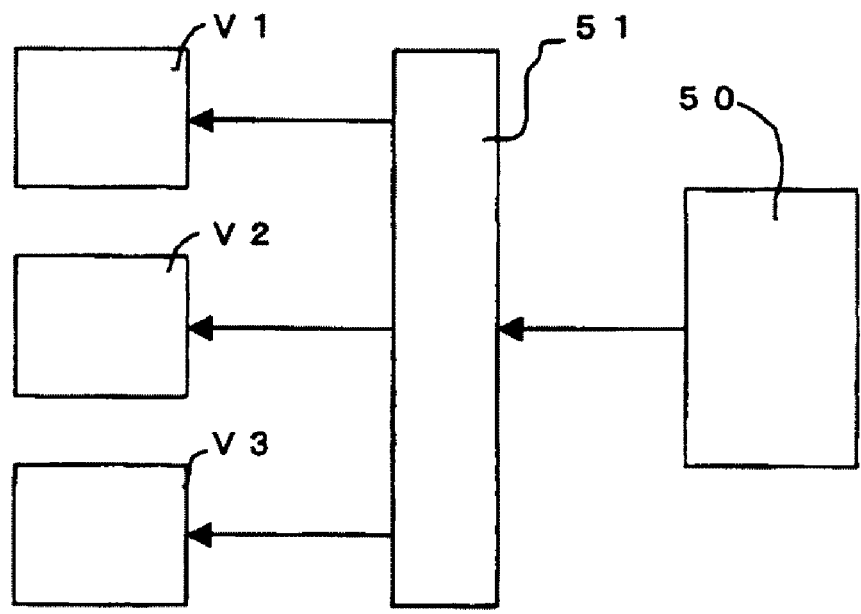
[FIG. 13] A schematic structure view showing a control system including an automatic valve control section used for a production device according to the present invention.

The catalyst suspending means includes a spraying means which generates 0.3 MPa high-pressure helium gas in the form of a pulse using the helium gas in the gas storage section 19 by intermittent opening/closing operation of the electromagnetic open/close valve V1, and sprays the helium gas from the front end of the high-pressure pulse gas introduction tube 13. The opening/closing operation of the electromagnetic open/close valve V1 is controlled by an automatic valve control section 50 (shown in FIG. 13) via a sequencer 51. The frequency of the operation ranges from 200 to 1000 times a minute. The automatic valve control section 50 is constituted of a microcomputer control section, which transmits a valve open/close control signal to the sequencer 51 in accordance with a built-in valve control program. The sequencer 51 receives a signal indicating open/close or switchover operation from the microcomputer control section, and transmits the open/close or switchover signal to each valve control section of the electromagnetic open/close valve V1, an electromagnetic three-way valve V2, or V3 (described later). The high-pressure pulse gas is sprayed from the front end of the high-pressure pulse gas introduction tube 13 to the catalyst accumulated in the catalyst storage tank 2 so as to suspend the catalyst microparticles.

The catalyst storage tank 2 includes catalyst carrying means which carries the suspended catalyst microparticles by a helium carrier gas to the catalyst supplying tube 9, thereby supplying the particles to the reactor 1. The catalyst carrying means is constituted of a helium gas compressed cylinder 20, a flow rate regulator 21 provided on the gas-discharge end of the helium gas compressed cylinder 20, an open/close valve 22, a gas flow rate controller 23 made of a mass flow controller, and a gas introduction path 14 for introducing a carrier gas to the catalyst storage tank 2. The present embodiment uses a helium gas as a high-pressure pulse gas for causing suspension of particles, in addition to the carrier gas for carrying the catalyst or material gas. Note that, apart from the helium gas, Ne, Ar, $N_2$, $H_2$ etc. may also be used as the carrier gas. In contrast to the material gas which is generally consumed by reaction, the carrier gas serving to carry the material gas or the catalyst causes no reaction and is not consumed.

The following explains sedimentation time of the catalyst microparticles using a calculation model. The relation between the particle diameter and the sedimentation time of the catalyst microparticles was examined based on the following Stokes' sedimentation formula ES.

$$Ut = D^2(\rho s - \rho t)g/18\mu \quad \text{ES}$$

Ut: sedimentation velocity (termination velocity) (m/s)
D: particle diameter (m)
$\rho s$: particle density (kg/m$^3$)
$\rho t$: fluid density (kg/m$^3$)
g: gravity acceleration (m/s$^2$)
$\mu$: fluid viscosity coefficient (kg/m·s)

Assuming iron microparticles and helium fluid, sedimentation velocity was calculated according to the foregoing formula ES in two cases where the particle diameter is 0.1 μm and 1 μm. The result showed that the sedimentation velocity of the iron microparticles in helium was about $10^{-7}$ m/s in the case where the particle diameter was 0.1 μm, and was about $10^{-5}$ m/s in the case where the particle diameter was 1 μm. That is, the model calculation showed that the microparticles are substantially suspended and the sedimentation velocity in fluid is the same as the gas flow rate. Accordingly, in supplying a catalyst into a reactor, it is preferable to directly introduce catalyst microparticles suspended in advance in a gas atmosphere into the reactor under heating.

As shown in the model calculation, the sedimentation velocity increases as the particle diameter increases, and therefore the catalyst microparticles 43 having been brought into suspension state by the high-pressure pulse gas sprayed from the front end of the high-pressure pulse gas introduction tube 13 freely fall by gravity. Heavy particles with large diameters settle faster than particles with small diameters, and are accumulated again in the catalyst storage tank 2. With this difference in sedimentation velocity, the particle diameter of the catalyst microparticle was easily and accurately selected. More specifically, with the foregoing suspension manner microparticles of small diameters used for generation of carbon nano structure are selected. The selected catalyst microparticles are lead to the reactor 1 via the supplying tube 9.

A different catalyst is used depending on the type of carbon nano structure. Suitable examples of catalyst include iron, cobalt, nickel, iron alloy, cobalt alloy, nickel alloy, iron oxide, cobalt oxide, and nickel oxide. These materials may be used solely or in combination. A carbide catalyst can also be used. Particularly preferable in the production of carbon nanocoil is a multi-component catalyst such as a three-component catalyst obtained by adding Indium, Aluminum, or Chrome to an iron-tin type composition, or a carbide catalyst obtained by carbonization of those catalysts, such as Fe—In—Sn, Fe—Al—Sn, or Fe—Cr—Sn. A multi-component oxide catalyst or a carbide catalyst obtained by carbonization of the multi-component oxide catalyst, such as Fe—In—Sn—O, Fe—Al—Sn—O, Fe—Cr—Sn—O or their carbide is also preferable.

The catalyst storage tank 2 includes a catalyst stable supply means, which serves to keep the reaction field of the reactor 1 stable while the catalyst is suspended, and the suspended catalyst microparticles having been selected are carried and supplied to the reactor 1. The catalyst stable supply means is constituted of an electromagnetic three-way valve V2 which is provided on the side where the catalyst supplying tube 9 is provided and is switched by an automatic valve control section 50 (shown in FIG. 13), and a second catalyst carrying means which is provided on the side where the catalyst supplying tube 9 is provided and carries and supplies suspended catalyst microparticles to the reactor 1 by the second carrier gas. The second catalyst carrying means is constituted of a helium compressed gas cylinder 27, a flow rate regulator 28 provided on the gas discharge end of the helium compressed gas cylinder 27, an open/close valve 29, a gas flow rate controller 30 constituted of a mass flow controller, and an electromagnetic three-way valve V3 switched by an automatic valve control section 50. The electromagnetic three-way valve V2 is controlled by the automatic valve control section 50 via a sequencer 51 so that it is selectable between (i) a stop mode in which the catalyst supply to the reactor 1 stops and (ii) a supply mode in which the catalyst supply to the reactor 1 is carried out.

The electromagnetic three-way valve V2 is switched into the stop mode during the step for suspending the catalyst by the spraying of a high-pressure pulse gas by the intermittent opening/closing operation of the electromagnetic open/close valve V1 and in the subsequent stationary-rest step. Meanwhile, as shown in the arrow "a1" of FIG. 1, the gas in the catalyst storage tank 2 is not lead to the catalyst supplying tube 9, but is lead to the discharge path via the filter 26. At this time, the electromagnetic three-way valve V3 is switched into the carrier gas supply mode in which the carrier gas of the helium compressed gas cylinder 27 is supplied to the reactor 1 via the gas supplying path 11 which is merged with the catalyst supplying tube 9. With this arrangement, the pressure in the gas flow path to the reactor 1 is kept at the same level even though the electromagnetic three-way valve V2 is in the stop mode under which the supply of carrier gas from the helium compressed gas cylinder 20 is suspended.

Then, after the suspension of catalyst by the spraying of high-pressure pulse gas and stationary-rest, as shown by the arrow "b1" of FIG. 1, the electromagnetic three-way valve V2 is switched to the supply mode, leading the suspended catalyst microparticles in the catalyst storage tank 2 to the reactor 1 via the catalyst supplying tube 9 using a carrier gas supplied from the helium compressed gas cylinder 20. At this time, the electromagnetic three-way valve V3 is switched to the carrier gas discharge mode in which it is opened to a gas flow path for discharging the carrier gas from the helium compressed gas cylinder 27 so that the catalyst carriage is carried out only by the carrier gas from the helium compressed gas cylinder 20. With the catalyst stable supply means, it becomes possible to maintain the pressure in the reactor 1 at a certain level without pressure fluctuation both in the supply mode under which the selected catalyst microparticles are supplied, and in the stop mode under which the catalyst is being suspended and the catalyst microparticles are not supplied. That is, if the carriage of catalyst is carried on without blocking the gas distribution to the catalyst supplying tube 9 in the catalyst suspending operation, pressure fluctuation occurs due to the spraying of the high-pressure pulse gas, and this pressure fluctuation is propagated to the reactor 1 and disturbs the reaction field, thereby interfering stable growth of carbon nano structure. However, according to the present embodiment, in the case of carrying out selecting process of the diameter of the catalyst microparticle at the preceding stage, the gas distribution is maintained by the carrier gas supplied from the helium compressed gas cylinder 27 by the catalyst stable supply means even when the preceding stage is blocked. Therefore the reaction field of the reactor 1 is not disturbed, and stable sequential production of carbon nano structure is ensured.

The following explains a production method of carbon nano structure by the foregoing production device including a convection regulator 61. The reactor 1 was heated approximately to 700° C., a $C_2H_2$ gas whose concentration was 8.4 (vol %) was used as a material gas, and a He gas was used as a carrier gas. In the catalyst suspension step, the pulse application time was set to three seconds, the stationary-rest after the high-pressure pulse gas application was set to three seconds, and the pulse application cycle was 3 minutes. With this catalyst suspending condition, the amount of catalyst supplied to the reactor 1 was set to $1.179 \times 10^{-1}$ (mg/min). A 11 SCCM of $C_2H_2$ gas was supplied from the material compressed gas cylinder 31 to the reactor 1, and a 60 SCCM of carrier gas was supplied from the compressed gas cylinders 20 and 27 to the reactor 1. The total gas flow rate supplied to the reactor 1, which included the amount of the 60 SCCM carrier gas for suppressing the upward flow from the helium compressed gas cylinder 36, was 131 SCCM. A catalyst of Fe—In—Sn—O was used in this example.

In the first manufacturing example under the foregoing condition, 8 hours of continuous manufacturing in the reactor 1 by the CVD method resulted in collection of 1.4 g of carbon nano structure, such as a carbon nanocoil, from the collection tank 7.

Further, the second and the third continuous productions were performed under the foregoing catalyst suspending condition but with different settings of material gas supply amount, catalyst supply amount and carrier gas flow rate. In the second manufacturing example, the amount of catalyst supplied to the reactor 1 was $1.546 \times 10^{-1}$ (mg/min), and a 14.5 SCCM of $C_2H_2$ gas was supplied by a 120 SCCM of carrier gas, making the total gas flow rate 194.5 SCCM. The second manufacturing example in total produces 2.9 g of carbon nano structure such as a carbon nanocoil. In the third manufacturing example, the amount of catalyst supply to the reactor 1 was $2.348 \times 10^{-1}$ (mg/min), and a 21.9 SCCM of C2H2 gas was supplied by a 180 SCCM of carrier gas, making the total gas flow rate 261.9 SCCM. The third manufacturing example in total produces 3.9 g of carbon nano structure such as a carbon nanocoil.

As described in the first to third manufacturing example, in the production device according to the present invention, the collection amount of the carbon nano structure resulted from 8 hours of continuous manufacturing by the CVD method was 1.4 g, 2.9 g, and 3.9 g. From the first to third, the amount was increased each by a large rate. According to this result, it was found that in this method the catalyst microparticles and the $C_2H_2$ gas were continuously brought in contact with each other in the CVD process, and were reacted efficiently. On the other hand, the same experiments were carried out without a convection regulator 61, with the result that the weights of the product carbon nano tube were 0.7 g, 1.5 g, and 1.9 g, that were about half of those above. After the experiments, a concrete of catalyst was found adhered on the inner wall of the quartz tube on an upper portion of the heater with an acetylene decomposition product.

Note that, though the present embodiment controls particle size by way of suspension of the catalyst in the catalyst storage tank 2 with introduction of high-pressure pulse gas, the present invention is also applicable to a method in which a catalyst of powder, mist, or gas state is supplied to the reactor 1 as such.

Next, the following explains experiment examples for confirming the effect of provision of convection regulator 61 according to the present invention. Note that, in Examples 1 to 3 below, the large-sized reactor shown in FIG. 2 was used instead of a small reactor (see FIG. 1) for use in particle size control.

FIG. 15 shows the result of comparative experiments by showing the amounts of carbon nano structure collected from the collection section of the collection tank 7. The measurement of the collection amount was carried out at three stages: first 3 minutes after the introduction of catalyst, 3 to 6 minutes, and 6 to 9 minutes.

EXAMPLE 1

Figure 14:
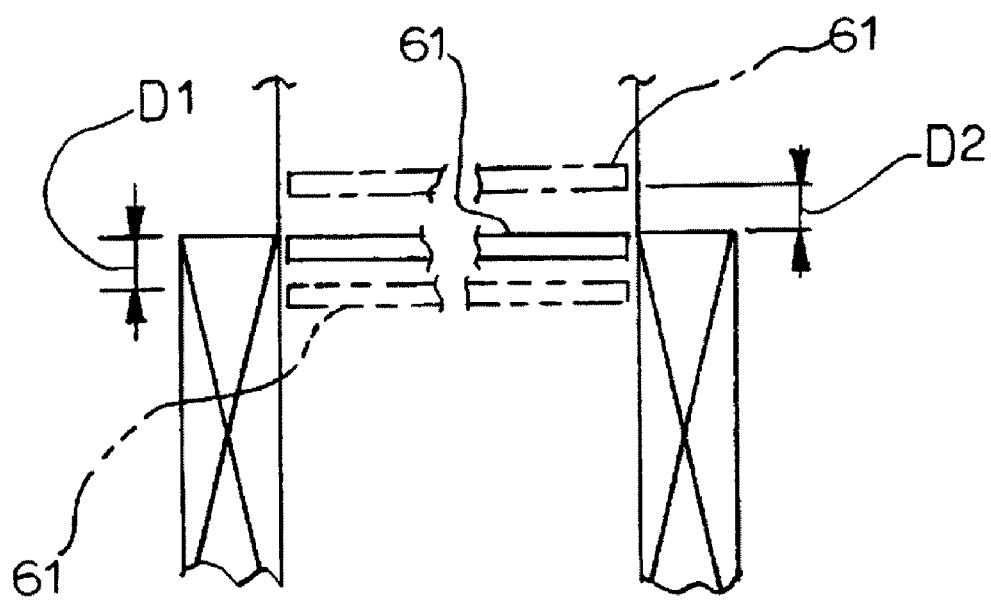
[FIG. 14] A drawing of an installation position of a regulator for each of Examples of the present invention, showing the effect of provision of regulator.

As shown by the solid lines of FIG. 14, the convection regulators 61 are disposed on a portion corresponding to the ends of the heat applicators 12. FIG. 15 shows gas flow rate condition in the present experiment. The gas flow rates of the carrier gas in use for supply of material gas (a first carrier gas, hereinafter) supplied from the helium compressed gas cylinder 27a and a material gas, and an upward flow suppressing gas (the second carrier gas, hereinafter) supplied from the helium compressed gas cylinder 36 are 2.64 slm, 0.36 slm, and 3 slm, respectively. Note that, acetylene was used as a material gas, and the heater was set so that the temperature inside the reactor becomes 700° C. (the same temperature is set in all of the following Examples etc.).

More specifically, in the present example, the reaction region in the reactor corresponds to the portion less than the convection regulator 61. In the present example, the convection regulator 61 prevents the low-temperature gas of the low-temperature region in an upper portion of the reactor from flowing into the reaction region in a lower portion of the reactor, and therefore the temperature in the reaction region becomes stable. The temperatures of the several portions (the lower face of the convection regulator 61, the center of the reactor etc.) in the reaction region were measured by a thermocouple meter with the result that they were all about 700° C. It was also fairly constant over time.

As shown in FIG. 15, the collection amounts of carbon nano structure in this example (Example 1) were 0.21 (g) and 0.12 (g), respectively, at the stages of 3 to 6 minutes and 6 to 9 minutes after introduction of catalyst.

EXAMPLE 2

As shown by the double-dashed line in FIG. 14, the convection regulators 61 are shifted downward from the portion corresponding to the ends of the heat applicators 12 by the length D1 (50 mm) by the movement mechanism. The flow rates of first carrier gas, the material gas, and the second carrier gas are the same as those of Example 1.

More specifically, in the present example, the convection regulators 61 are provided below the ends (boundaries) of the heat applicators 12, and the area less than the convection regulators 61 serves as a reaction region in the reactor. Therefore, in the present example, the upper portion of the reaction region (the convection regulators 61 and the nearby area) is also fully heated by the heat applicators 12, and the temperature distribution in the reaction region in the vertical direction is further even and stable. The structure of the present example thus more effectively retains and heats the material gas and the catalyst in the reactor, thereby facilitating synthesis of carbon nano structures.

As shown in FIG. 15, the collection amounts of carbon nano structure in this example (Example 2) were 0.11 (g) and 0.23 (g) respectively at the stages of 3 to 6 minutes and 6 to 9 minutes after introduction of catalyst. In comparison with the result of Example 1, the gross amount of the collected carbon nano structure in the present example is almost the same at the stage of 3 to 9 minutes after introduction of catalyst, but the ratio of collected carbon nanotube after the longer retention time (6 to 9 minutes after introduction of catalyst) in the reactor is greater than that of Example 1.

EXAMPLE 3

As shown in the dashed lines of FIG. 14, the convection regulators 61 are shifted upward from the portion corresponding to the ends of the heat applicators 12 by the length D2 (50 mm) by the movement mechanism. The gas flow rates of the first carrier gas, the material gas, and the second carrier gas are 2.64 slm, 0.36 slm, and 5 slm, respectively.

More specifically, in the present example, the convection regulators 61 are provided above the ends (boundaries) of the heat applicators 12, and the area less than the convection regulators 61 serves as a reaction region in the reactor. Therefore, in the present example, the reaction region is included within the essential heat region; however the reaction region contains on its upper portion an area where the heat applicator 12 is not provided. If the gap between the ends (boundaries) of the heat applicators 12 and the convection regulators 61 is set too large in this layout, the convection regulators 61 will reside in the low-temperature region. More specifically, the reaction region includes the low-temperature region, that is the area other than the heat region. This contradicts the significance of the present invention. The present embodiment was carried out to thus confirm the allowable effective range of the position of the convection regulator 61.

As shown in FIG. 15, the collection amounts of carbon nano structure in this example (Example 3) were 0.08 (g), 0.11 (g) and 0.12 (g) respectively at the stages of within 3 minutes, 3 to 6 minutes and 6 to 9 minutes after introduction of catalyst.

In comparison with the results of Examples 1 and 2, the gross amount of the collected carbon nano structure in the present example is slightly smaller at the stage within 9 minutes after introduction of catalyst, but the ratio of collected carbon nanotube after the shorter retention time (within 3 minutes after introduction of catalyst) in the reactor is greater than those of Examples 1 and 2.

COMPARATIVE EXAMPLE 1

In a structure not having the convection regulator 61, the condition of gas flow rate is the same as that of Examples 1 and 2. As shown in FIG. 15, in the present comparative example (Comparative Example 1), the collection amount of carbon nano structure was 0.12 (g) at the stage of within 3 minutes after introduction of catalyst, but the collection amount was 0 (g) at the stage of 3 to 9 minutes after introduction of catalyst.

COMPARATIVE EXAMPLE 2

The same experiment as that of Example 3 was carried out with the gas flow rate condition of Examples 1 and 2. As shown in FIG. 15, in the present comparative example (Comparative Example 2), the collection amount of carbon nano structure was 0.12 (g) at the stage of within 3 minutes after introduction of catalyst, and was 0.07 (g) at the stage of 3 to 6 minutes after introduction of catalyst. However, the collection amount was 0 (g) at the stage of 6 to 9 minutes after introduction of catalyst.

Further, the conditions of carbon nano structures obtained in the respective examples and comparative examples were examined. The following show the details.

(1) In the structure having a convection regulator, the composite collected at the stage of within 3 minutes after introduction of catalyst mainly contains fibrous substances. On the other hand, the composite collected at the stage of 3 or more minutes after introduction of catalyst mainly contains carbon nanocoils.

(2) In Comparative Example 1 in which the convection regulator was not provided, the collection of composites were completed within 3 minutes after introduction of catalyst. The composite mainly contains fibrous substances. In the structure not including the convection regulator, the catalyst particles are carried by an intense upward flow, and are adhered to the inner wall of the quartz tube wall or a SUS flange 1a above the heater. The material gas decomposition product (acetylene decomposition product) is also carried upward, and becomes tar and is adhered to the same inner wall. This further facilitates adhesion of catalyst particles. Consequently, the catalyst particles do not reach the collection section. Further, the gas flow rate in the reactor is high, particularly, the gas flow rate in the center of the reactor is high and downward. Therefore, the catalyst is all discharged within 3 minutes after introduction of catalyst. In this case, carbon nano structures is hardly produced.

(3) Particularly, in Example 1 using the convection regulator, all the composites were collected at or after 3 minutes after introduction of catalyst.

Figure 16:
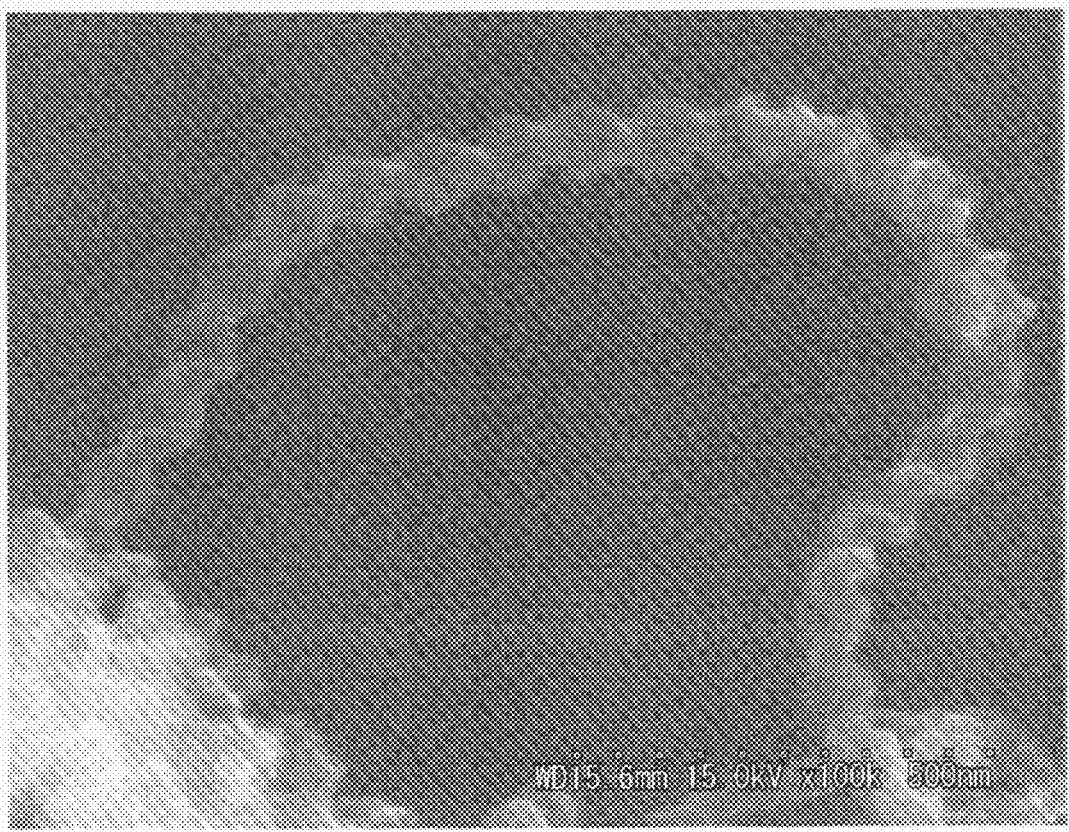
[FIG. 16] A SEM image showing a carbon nanocoil resulted from Example 2 of FIG. 14.

(4) Particularly, in Example 2 in which the convection regulator was shifted downward by 50 mm, production of composite was confirmed, and the collection amount was increased after 6 to 9 minutes. This is probably because the downward shifting of the convection regulator weakened the gas convection to be less than that of Example 1, which makes the catalyst to stay longer in the reactor. FIG. 16 shows a SEM image showing a carbon nanocoil collected after 6 to 9 minutes after introduction of catalyst. The change in collection amount due to the shift of convection regulator shows that synthesis time is reduced by more intensive convection which can be obtained by moving the convection regulator upward to be away from the heat applicators 12. On the other hand, the convection is weakened by moving the convection regulator to "the intermediate portion" of the heat applicators 12, and the synthesis time can be extended. Therefore, by thus providing the convection regulator 61 or the disk shaped regulator 72 adjustable in position, it is possible to cope with the variation in production condition of carbon nanostructure; for example, various modifications in reaction region according to the production condition of carbon nano structure determined by type of material gas or catalyst, the conditions of supply/introduction of material gas, catalyst, and carrier gas, or environmental condition such as the heating temperature in the reaction region.

(5) Particularly, in Comparative Example 2 in which the convection regulator is shifted upward by 50 mm under the same gas flow rate condition as that of Examples 1 and 2, the collection amount was greater than that of Comparative Example 1. However, the collection of composite was almost completed within 3 minutes after introduction of catalyst, and the resulting composites mainly contained fibrous substances. On the other hand, in Comparative Example 3 in which the convection regulator is shifted upward by 50 mm and the amount of the second carrier gas was increased from 3 slm to 5 slm, the collection amount at or after 3 minutes was increased. This is because the second carrier gas served to suppress the upward flow even though the convection becomes more intense by the rise of the convection regulator. Accordingly, the control in reaction time becomes possible not only by the position of convection regulator but also by the flow rate of the second carrier gas. This is particularly effective in the case of using a catalyst with a predetermined reaction time.

Figure 17:
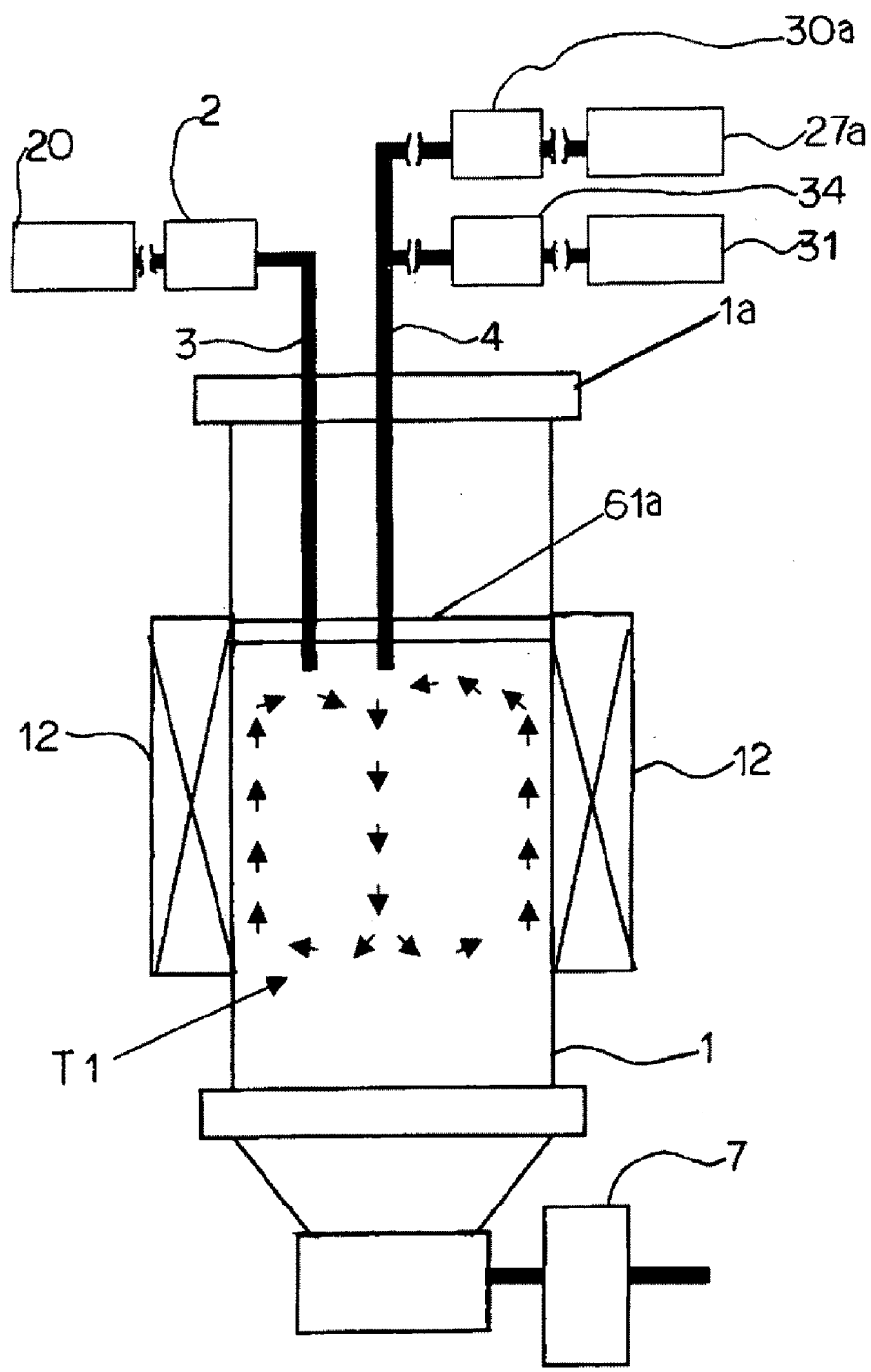
[FIG. 17] A schematic structure view showing installation state of a regulator according to another embodiment of the present invention.

As described above, the convection regulator 61 according to the present embodiment has a disk shape whose diameter is smaller than the internal diameter of the reactor 1, making a gap between the convection regulator 61 and the wall of the reactor 1. The second carrier gas serving as an upward flow suppressing gas flows into the reaction region through this gap. This flow of the second carrier gas generates a downward flow which blocks the upward flow containing the material gas or the catalyst. Therefore, the gas resulted from decomposition of the material gas is prevented from flowing into the upper end of the reactor 1. On this account the synthesis efficiency of carbon nano structure increases. As shown in FIG. 17, in the case of a reactor not supplied with the second carrier gas, a disk-shaped convection regulator 61a whose external diameter is almost equal to the internal diameter of the reactor 1 may be used. In this case, a reaction region with closed-upper end is formed, and no gap is formed between the convection regulator 61a and the wall of the reactor. This structure prevents the catalyst or the gas resulted from decomposition of the material gas from flowing upward into a portion outside the thermal region provided by the heater. Further, only a convection T1 is generated in the convection regulator 61a, and the internal temperature of the reactor becomes even and stable. This enlarges the synthesis range of carbon nano structure. Furthermore, the upward flow doe not flow into the rear side of the convection regulator 61a. This weakens the convection, and extends the synthesis time of carbon nano structure. As with the foregoing embodiments, the convection regulator 61a may be set vertically movable, which allow the range of reaction region adjustable.

Note that, the reactor 1 has been described as a cylinder constituted of a quartz tube, but the shape or the material of the reactor of the present invention is not limited to those used in the foregoing examples. For example, the reactor may be a polygonal column such as a quadratic prism (rectangular solid) or a triangular prism. Also the reactor may be made of metal. In the case of using a polygonal column reactor, the shape of the convection regulator should also be changed according to the shape of the reactor.

Further, as to the way of driving the reactor, the production device for carbon nano structure according to the present invention may adopt both a batch-wise driving mode in which the materials are supplied on a batch-basis and the carbon nano structures are produced intermittently, and a sequential driving mode in which the materials are sequentially supplied and the carbon nano structures are produced sequentially.

The present invention is not limited to the description of the embodiments above, but may be altered by a skilled person within the technical concept of the invention.

INDUSTRIAL APPLICABILITY

With the production device according to one embodiment of the present invention, for example, in supplying a material gas, a catalyst and a carrier gas from an upper portion of a reactor, the reaction region determining means securely sets the reaction region within a region other than the low-temperature region which is generated in an upper portion of the reactor. The present invention thus provides a production device ensuring more efficient production of carbon nano structure.

With the production device according to another embodiment of the present invention, said reaction region determining means includes changing and setting means for changing a size of said reaction region. With this structure, it is possible to set the reaction region according to various production conditions, and therefore the device can cope with the variation in production state of carbon nano structure. The present invention thus provides a production device superior in versatility.

With the production device according to another embodiment of the present invention, said reaction region determining means is constituted of a regulator which serves to regulate the fluid flow entering into the introduction end of the reactor, and therefore the convection state is efficiently generated in the reaction region. The present invention thus provides a production device ensuring more efficient production of carbon nano structure.

With the production device according to another embodiment of the present invention, said convection shielding means which forms a convection shielding region formed by a gas spraying manner. The convection shielding region serves to regulate the fluid flow circulating in the reactor, and therefore the convection state is efficiently generated in the reaction region. The efficiency in production of carbon nano structure thus increases. Particularly, the convection shielding means according to the present invention may be easily provided in the reactor, as it forms the convection shielding region by spray of gas.

With the production device according to another embodiment of the present invention, said regulator is constituted of a covering body with a depression. With this structure, the covering body securely blocks the upward flow of the convection, which is generated on heating the reactor, by causing the fluid flow to be reflected by the regulator into the center of the reactor. With this structure, the convection state is efficiently generated. The present invention thus provides a production device ensuring more efficient production of carbon nano structure.

The production device according to another embodiment of the present invention further comprises heating and supplying means for supplying the material and the catalyst into said reactor while heating at least one of the material gas and the catalyst. With this structure, it is possible to prevent decrease in temperature in the vicinity of the introduction section at the time of introducing the material gas and/or the catalyst into the reactor. On this account, the contamination due to accumulation of concretion of the catalyst or material gas decomposition product can be prevented. Further, it is also possible to enlarge the reaction region to the introduction section, and the production efficiency of carbon nano structure further increases.

With the production device according to another embodiment of the present invention, said reactor includes plural portions supplying means for supplying at least one of the material gas and the catalyst to plural portions of said reactor. With this structure using the plural portions supplying means, the material gas and/or the catalyst can be evenly distributed to the reactor. Therefore the material gas and/or the catalyst are reacted in the whole reaction region in the presence of the convection state. The present invention thus provides a production device ensuring mass production of carbon nano structure.

With the production device according to another embodiment of the present invention with plural tubes for supplying at least one of the material gas and the catalyst to plural portions in said reactor, the material gas and/or the catalyst can be evenly distributed to the reactor. Therefore the material gas, the catalyst, and the carrier gas are reacted in the whole reaction region in the presence of the convection state. The present invention thus provides a production device ensuring mass production of carbon nano structure.

With the production device according to another embodiment of the present invention, said plural tubes provided with plural outlets in plural different portions, which evenly distributes the material gas and/or the catalyst to the reaction region. Therefore, the present invention thus provides a production device in which the material gas and/or the catalyst are reacted in the whole reaction region in the presence of the convection state.

Another embodiment of the present invention is a method for producing a carbon nano structure wherein, on introduction of the material gas, the catalyst and the carrier gas into the reactor from the upper portion of a reactor, the reaction region determining means securely sets the reaction region within a region other than the low-temperature region which is generated in an upper portion of the reactor. On this account, the convection state is efficiently made in the reaction region. The present invention thus provides a production device ensuring mass production of carbon nano structure.

The production device according to another embodiment of the present invention includes the reaction region determining means. With this structure, it is possible to set the reaction region according to various conditions in production of carbon nano structure. The present invention thus copes with the variation in production state of carbon nano structure.

With the production device according to another embodiment of the present invention, a fluid flow of the convection flowing toward a material gas insertion end of said reactor is regulated by the regulator. With this structure, the convection state is efficiently generated in the reaction region. The efficiency in production of carbon nano structure thus increases.

With the production device according to another embodiment of the present invention, the convection shielding region, which is formed through a gas spraying manner, serves to regulate the fluid flow toward a material gas insertion end of the reactor, and therefore the convection state is efficiently generated in the reaction region. The efficiency in production of carbon nano structure thus increases.

With the production device according to another embodiment of the present invention, at least one of the material gas and the catalyst is heated when supplied into said reactor. With this structure, it is possible to prevent decrease in temperature in the vicinity of the introduction section at the time of introducing the material gas and/or the catalyst into the reactor. On this account, the contamination due to accumulation of concretion of the catalyst or material gas decomposition product can be prevented. Further, it is also possible to enlarge the reaction region to the introduction section, and the production efficiency of carbon nano structure further increases.

With the production device according to another embodiment of the present invention, the material gas and/or the catalyst is supplied to plural different portions of said reactor. With this structure, the material gas and the catalyst are reacted in the whole reaction region in the presence of the convection state. This ensures mass production of carbon nano structure.

With the production device according to another embodiment of the present invention, said catalyst is the carbide catalyst or the oxide catalyst. Therefore, the reaction of the material gas and the carbide catalyst or the oxide catalyst is carried out in the reaction region in which the convection state is efficiently produced. This ensures mass production of carbon nano structure.

The invention claimed is:

1. A production device for producing a carbon nano structure by fluidizing a material gas and a catalyst in a heated reactor so as to react the material gas and the catalyst, said production device including reaction region determining means for determining a reaction region where the material gas and the catalyst are fluidized, said determining means determining said reaction region within a heated region in said reactor.

2. The production device for producing a carbon nano structure as set forth in claim 1, wherein said reactor is a tube including a heater on its periphery, and said reaction region determining means sets said reaction region where the material gas and the catalyst are fluidized in said reactor so that the reaction region resides within a region having the heater.

3. The production device for producing a carbon nano structure as set forth in claim 1, wherein said reaction region determining means sets said reaction region where the material gas and the catalyst are fluidized in said reactor so that the reaction region resides within a region having a temperature equal to or greater than a synthesis temperature of the carbon nano structure.

4. The production device for producing a carbon nano structure as set forth in claim 3, wherein the temperature is 500° C.

5. The production device for producing a carbon nano structure as set forth in claim 1, wherein said reaction region determining means is constituted of a regulator which serves to regulate a fluid flow into a region other than the reaction region in said reactor.

6. The production device for producing a carbon nano structure as set forth in claim 5, wherein said regulator is constituted of a covering body with a depression facing to the reaction region.

7. The production device for producing a carbon nano structure as set forth in claim 1, wherein said reaction region determining means determines the reaction region by spraying gas into the fluid flow in said reactor.

8. The production device for producing a carbon nano structure as set forth in claim 1, wherein said reactor contains convection due to temperature variation.

9. The production device for producing a carbon nano structure as set forth in claim 1, wherein said reaction region determining means includes changing and setting means for changing a size of said reaction region.

10. The production device for producing a carbon nano structure as set forth in claim 1, further comprising heating and supplying means for supplying the material and the catalyst into said reactor while heating at least one of the material gas and the catalyst.

11. The production device for producing a carbon nano structure as set forth in claim 1, wherein said reactor includes plural portions supplying means for supplying at least one of the material gas and the catalyst to plural portions of said reactor.

12. The production device for producing a carbon nano structure as set forth in claim 11, wherein said plural portions supplying means is constituted of plural tubes for supplying at least one of the material gas and the catalyst to plural portions in said reactor.

13. The production device for producing a carbon nano structure as set forth in claim 11, wherein said plural portions supplying means is constituted of a tube having plural outlets in plural different portions, said plural portions supplying means discharging at least one of the material gas and the catalyst from the plural outlets so as to supply the material gas and/or the catalyst to said reactor.

14. A production device for producing a carbon nano structure by fluidizing a material gas and a catalyst in a heated reaction region in a reactor to generate convection, so that said material gas and said catalyst are brought into contact with each other in the reaction region, said production device including reaction region determining means for determining the reaction region within said reactor.

15. The production device for producing a carbon nano structure as set forth in claim 14, wherein said reaction region determining means is constituted of a regulator provided on a material gas insertion end of said reactor, said regulator serving to regulate a fluid flow of the convection flowing toward the material gas insertion end of said reactor.

16. The production device for producing a carbon nano structure as set forth in claim 15, wherein said regulator is constituted of a covering body with a depression facing to the reaction region.

17. The production device for producing a carbon nano structure as set forth in claim 14, wherein said reaction region determining means is constituted of convection shielding means which determines the reaction region by forming a convection shielding region, said convection shielding means forming the convection shielding region by spraying gas in the presence of the convection into a circulating fluid flowing toward a material gas insertion end of said reactor.

18. A method for producing a carbon nano structure by fluidizing a material gas and a catalyst in a heated reactor so as to react the material gas and the catalyst, said reactor including reaction region determining means for determining a reaction region where the material gas and the catalyst are fluidized, said determining means determining said reaction region within a heated region in said reactor, said carbon nano structure being produced within the reaction region.

19. The method for producing a carbon nano structure as set forth in claim 18 wherein said reaction region determining means changes a size of said reaction region.

20. The method for producing a carbon nano structure as set forth in claim 18 wherein a fluid flow of the convection flowing toward a material gas insertion end of said reactor is regulated by a regulator provided on the material gas insertion end of said reactor.

21. The method for producing a carbon nano structure as set forth in claim 18 wherein said reaction region is determined by forming a convection shielding region, said convection shielding region being formed by spraying gas in the presence of the convection into a circulating fluid flowing toward a material gas insertion end of said reactor.

22. The method for producing a carbon nano structure as set forth in claim 18 wherein at least one of the material gas and the catalyst is heated when supplied into said reactor.

23. The method for producing a carbon nano structure as set forth in claim 18 wherein at least one of the material gas and the catalyst is supplied to plural different portions of said reactor.

24. The method for producing a carbon nano structure as set forth in claim 18 wherein said catalyst is a carbide catalyst.

25. The method for producing a carbon nano structure as set forth in claim 18 wherein said catalyst is an oxide catalyst.

26. A method for producing a carbon nano structure by fluidizing a material gas and a catalyst in a heated reaction region of a reactor to generate convection, so that said material gas and said catalyst are brought into contact with each other in the reaction region, said reactor including reaction region determining means for determining the reaction region within said reactor, said carbon nano structure being produced within the reaction region determined by said reaction region determining means.

* * * * *